US010606246B2

(12) United States Patent
Yamamoto et al.

(10) Patent No.: US 10,606,246 B2
(45) Date of Patent: Mar. 31, 2020

(54) CONTROL DEVICE AND CONTROL METHOD WITH VARIOUS COMMAND VALUES IN A SHARED MEMORY PROVIDING ACCESS TO VARIOUS PROGRAM EXECUTION AND COMMAND VALUE OPERATION PARTS IN EACH CONTROL CYCLE

(71) Applicant: OMRON Corporation, Kyoto (JP)

(72) Inventors: Eiji Yamamoto, Kyoto (JP); Masahiko Nakano, Ritto (JP); Junji Shimamura, Takatsuki (JP)

(73) Assignee: OMRON Corporation, Kyoto (JP)

( * ) Notice: Subject to any disclaimer, the term of this patent is extended or adjusted under 35 U.S.C. 154(b) by 77 days.

(21) Appl. No.: 15/893,700

(22) Filed: Feb. 12, 2018

(65) Prior Publication Data
US 2019/0079499 A1 Mar. 14, 2019

(30) Foreign Application Priority Data

Sep. 12, 2017 (JP) ................................ 2017-174922

(51) Int. Cl.
*G05B 19/418* (2006.01)
*G05B 19/05* (2006.01)

(52) U.S. Cl.
CPC ..... *G05B 19/41835* (2013.01); *G05B 19/056* (2013.01); *G05B 2219/1105* (2013.01);
(Continued)

(58) Field of Classification Search
CPC ............ G05B 19/41835; G05B 19/056; G05B 2219/34288; G05B 2219/1134; G05B 2219/1105; G05B 2219/13152
See application file for complete search history.

(56) References Cited

U.S. PATENT DOCUMENTS 5,912,814 A 6/1999 Flood
2012/0239201 A1 9/2012 Kobayashi et al.
2017/0153634 A1* 6/2017 Koga .................. G05B 19/416

FOREIGN PATENT DOCUMENTS

EP 2902862 8/2015
JP 2012160180 8/2012
WO 2016068929 5/2016

OTHER PUBLICATIONS

"Search Report of Europe Counterpart Application", dated Sep. 14, 2018, p. 1-p. 7.

* cited by examiner

*Primary Examiner* — Robert E Fennema
*Assistant Examiner* — Marzia T Monty
(74) *Attorney, Agent, or Firm* — JCIPRNET

(57) ABSTRACT

In a control device which can execute a first program entirely scanned in each control cycle to update a command value, and a sequentially interpreted second program, an environment for realizing higher control performance is provided. The control device includes a first program execution part scanning the entire first program in each control cycle to update a command value and a second program execution part updating the command value in each control cycle according to a sequentially interpreted second program. The second program execution part includes an interpreter generating an intermediate code and a command value operation part calculating the command value in each control cycle according to the intermediate code. The command value operation part outputs the command value in each control cycle so that the command value can be used in other processes.

10 Claims, 13 Drawing Sheets

(52) U.S. Cl.
CPC .............. *G05B 2219/1134* (2013.01); *G05B 2219/13152* (2013.01); *G05B 2219/34288* (2013.01)

CONTROL DEVICE AND CONTROL METHOD WITH VARIOUS COMMAND VALUES IN A SHARED MEMORY PROVIDING ACCESS TO VARIOUS PROGRAM EXECUTION AND COMMAND VALUE OPERATION PARTS IN EACH CONTROL CYCLE

CROSS-REFERENCE TO RELATED APPLICATION

This application claims the priority benefit of Japanese application serial no. 2017-174922, filed on Sep. 12, 2017. The entirety of the above-mentioned patent application is hereby incorporated by reference herein and made a part of this specification.

BACKGROUND

Technical Field

The disclosure relates to a control device and a control method for controlling a control target.

Description of Related Art

Factory automation (FA) technology using control devices such as a programmable controller (PLC) has come into widespread in various production fields. Such control devices not only directly control a control target but also give a control command to other devices to indirectly control a control target in some cases. For example, Japanese Patent Application Laid Open No. 2012-160180 (Patent Document 1) discloses a numerical control machine tool which mechanically processes workpieces. In a configuration thereof, an NC control device and a PLC control device are connected to each other through a signal line, and information of the NC control device is transferred to the PLC control device through the signal line.

In the configuration disclosed in Japanese Patent Application Laid Open No. 2012-160180 (Patent Document 1), the NC control device which sequentially executes an NC program and the PLC control device which executes a program at fixed intervals asynchronously execute the programs. Accordingly, in the PLC control device, input data collected by the PLC control device control in each control cycle and information from the NC control device (e.g., a command value and the like calculated by executing the NC program) have different collection timings. Since the collecting timings are not consistent with each other, the data and information can be used for monitoring for prevention of collision and the like and, for example, a process of correcting a command value in real time cannot be realized.

SUMMARY

The disclosure is to provide an environment for realizing better control performance in a control device capable of executing a first program entirely scanned in each control cycle to update command values and a sequentially interpreted second program.

In an embodiment of the disclosure, a control device for controlling a control target is provided. The control device includes: a data update part which updates input data and output data in each control cycle; a first program execution part which scans an entire first program in each control cycle to update a command value; and a second program execution part which updates a command value in each control cycle according to a sequentially interpreted second program. The second program execution part includes: an interpreter which interprets at least part of the second program to generate an intermediate code; and a command value operation part which calculates the command value in each control cycle according to the intermediate code generated by the interpreter. The command value operation part outputs the command value in each control cycle in a manner in which the command value can be used in other processes.

DESCRIPTION OF THE EMBODIMENTS

Figure 1:
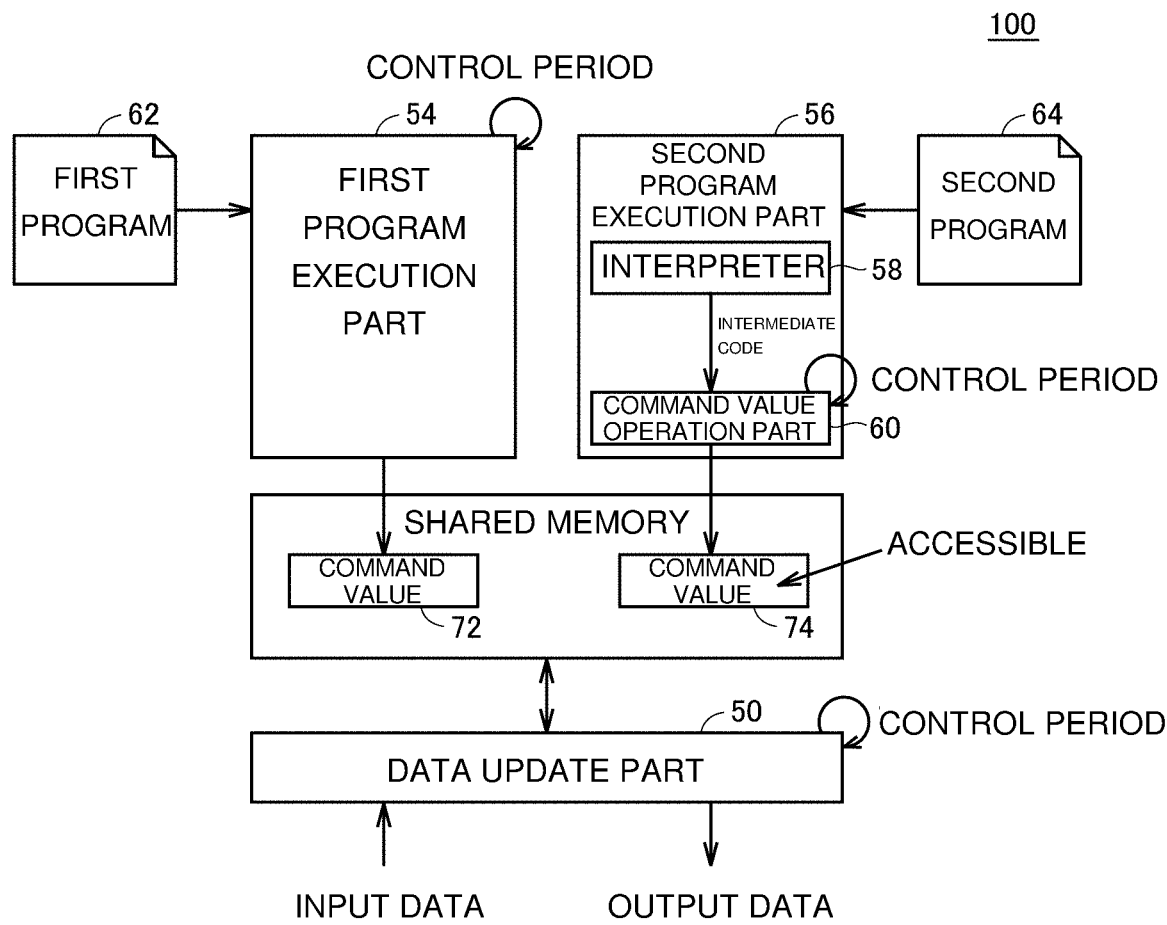
FIG. 1 is a schematic diagram illustrating an example of an application situation of a control device according to the present embodiment.

Embodiments of the disclosure will be described in detail with reference to the drawings. The same signs will be attached to the same or corresponding parts in the drawings and description thereof will not be repeated.

A. Application Example

First, an example that the disclosure is applied will be described with reference to FIG. 1. FIG. 1 is a schematic diagram illustrating an example of an application situation of a control device 100 according to the present embodiment. The control device 100 according to the present embodiment controls an arbitrary control target (e.g., manufacturing apparatus and equipment).

As shown in FIG. 1, the control device 100 includes a data update part 50 which updates input data and output data in each control cycle, a first program execution part 54 which scans an entire first program 62 including at least a sequence instruction in each control cycle to update a command value 72, and a second program execution part 56 which updates a command value 74 in each control cycle according to a sequentially interpreted second program. The second program execution part 56 includes an interpreter 58 which interprets at least part of the second program to generate an intermediate code, and a command value calculation part 60 which calculates the command value 74 in each control cycle according to the intermediate code generated by the interpreter 58. The command value calculation part 60 outputs the command value 74 in each control cycle in a manner in which the command value can be used in other processes. The command value 72 and the command value 74 are saved in a shared memory 52 in which input data and output data are temporarily stored.

The "first program" in the disclosure includes a program which is entirely scanned whenever executed and in which one or more command values are calculated whenever executed. In the following description, an "IEC program" may be conceived as an example of the "first program." The "IEC program" typically includes a program composed of one or more instructions described according to the international standard IEC 61131-3 provided by the International Electrotechnical Commission (IEC). The "IEC program" can include a sequence instruction and/or a motion instruction. The entire IEC program is executed (scanned) in each control cycle. The "IEC program" is suitable for control requiring immediacy and high speed. Further, instructions included in the "IEC program" are not limited to instructions described according to the international standard IEC 61131-3 and the "IEC program" may include instructions autonomously provided by a programmable controller (PLC) manufacturer, vendor or the like.

In the present description, the "sequence instruction" is basically a term including one or more instructions described by one or more logic circuits which calculate an input value, an output value, an internal value and the like. Basically, the "sequence instruction" is executed from the beginning to the end in one control cycle and executed again from the beginning to the end in the next control cycle.

In the present description, the "motion instruction" is a term including one or more instructions for calculating numerical values such as a position, a velocity, an acceleration, a jerk, an angle, an angular velocity, an angular acceleration and an angular jerk as commands for actuators such as a servo motor. With respect to the "motion instruction," a program (motion program) of a motion instruction described according to a function block, a numerical value calculation formula and the like is executed from the beginning to the end in one control cycle. That is, a command value is calculated (updated) in each control cycle.

The "second program" in the disclosure includes any sequentially interpreted program. That is, the "second program" includes a program which is written in any language and can be executed in an interpreter manner of executing the program by sequentially interpreting the program line by line. In the following description, a program (referred to as an "NC program" hereinafter) which describes a behavior in computer numerical control (CNC) may be conceived as an example of the "second program." However, the second program is not limited to such an NC program and may be applied to, for example, a program for controlling robots, and the like. As an example, the NC program is written using "G language" and the program for controlling robots is written using a dedicated robot language in many cases.

The "intermediate code" in the disclosure is a concept including any instruction for calculating a command value in each control cycle according to a sequentially interpreted program (which was not originally suitable for a process of updating a command value in each fixed cycle). That is, the intermediate code may be any code if the command value calculation part 60 can calculate a command value in each control cycle using the code. Typically, the "intermediate code" includes one or more instructions or one or more functions.

The "manner in which the command value can be used in other processes" in the disclosure excludes manners in which an updated command value is exclusive or cannot be referred to and thus cannot be secondarily used. That is, a command value calculated by the command value calculation part 60 in a certain control cycle can be referred to or updated by being accessed through any processing, process, task or the like executed in the control device 100. A method of implementing the "manner that the command value can be used in other processes" can employ known techniques.

In the control device 100 according to the present embodiment, the first program 62 (i.e., a program which is entirely scanned whenever executed and in which one or more command values are calculated whenever executed) and the second program 64 (i.e., any program sequentially interpreted) are executed to calculate command values according to the respective programs in each control cycle. Although the second program 64 is executed in an interpreter manner and thus command value update in each fixed cycle is not guaranteed originally, an intermediate code is generated by the interpreter 58 in advance and a command value is calculated in each control cycle using the intermediate code in the present embodiment.

Accordingly, a command value according to the first program 62 and a command value according to the second program 64 are calculated in each control cycle and both are accessible, and thus a correction process for command values, a process of synchronizing and sampling a plurality of command values calculated according to different programs, and the like as will be described later can be easily realized.

Since such ease of data access is provided, a control operation with higher accuracy can be realized. In addition, command values according to different programs may be synchronized and collected and thus the accuracy of posteriori data analysis can be improved.

Furthermore, the control device 100 according to the present embodiment can simultaneously execute programs of a plurality of types having different properties, and thus it is not necessary to individually arrange a device for executing the first program 62 and a device for executing the second program 64 as in a conventional system. That is, since a conventional system realized using a plurality of individual devices can be realized using a single control device 100, there are merits in terms of space and costs.

Hereinafter, a more detailed configuration and processing of the control device 100 according to the present embodiment will be described as more specific application examples of the disclosure.

B. Example of Overall Configuration of Control System

Figure 2:
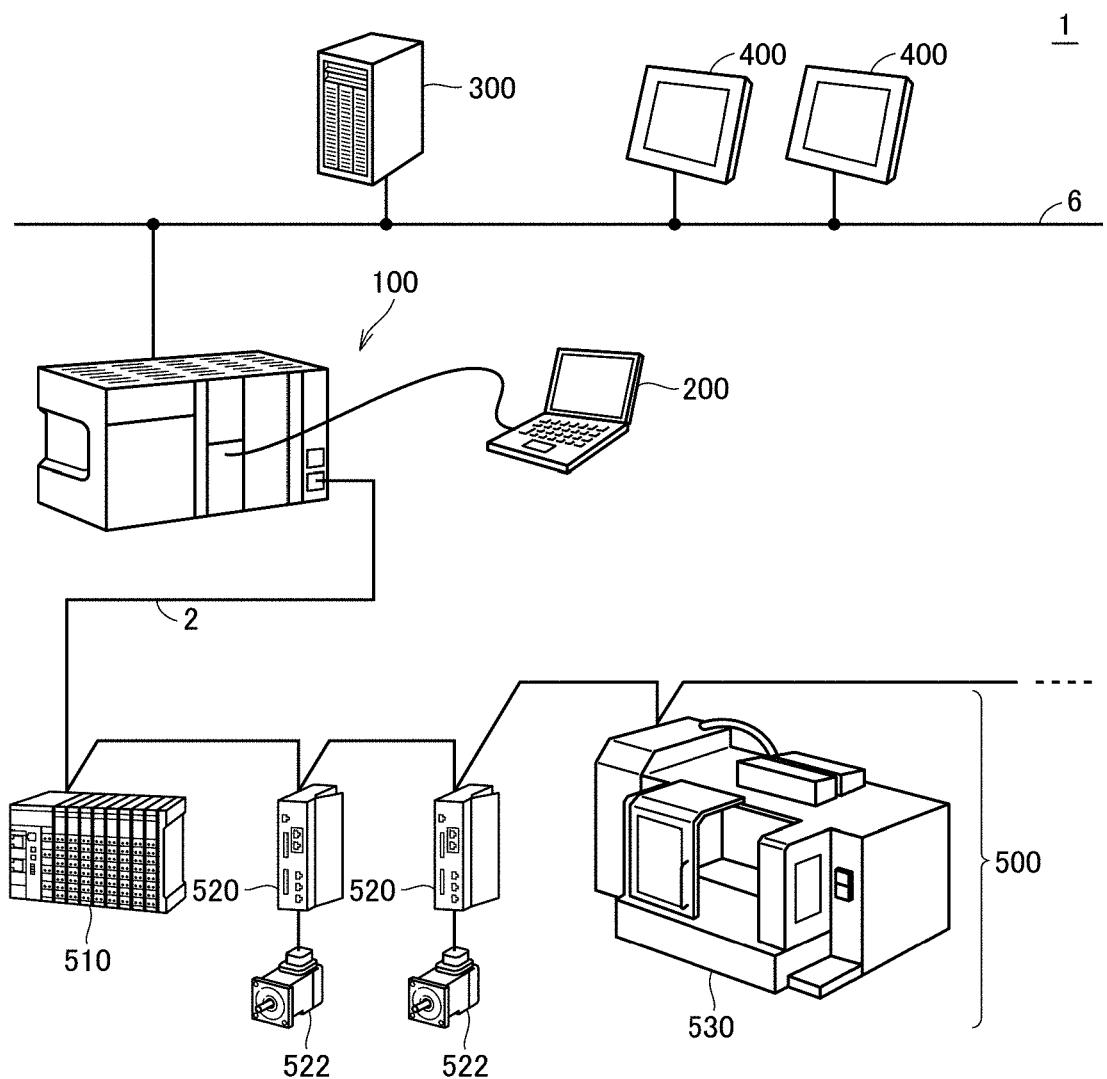
FIG. 2 is a schematic diagram illustrating an example of the overall configuration of a control system according to the present embodiment.

Next, an example of the overall configuration of a control system 1 including the control device according to the present embodiment will be described. FIG. 2 is a schematic diagram illustrating an example of the overall configuration of the control system 1 according to the present embodiment. FIG. 2 shows the control system 1 based on the control device 100 according to the present embodiment.

The control device 100 is equivalent to an industrial controller which controls control targets such as various facilities and apparatuses. The control device 100 is a kind of computer which executes a control operation as will be described later and may be typically realized as a PLC. The control device 100 may be connected to various field devices 500 through a field network 2. The control device 100 exchanges data with one or more field devices 500 through the field network 2 or the like. Although a "field network" is also referred to as a "field bus" in general, they are collectively called a "field network" in the following description for simplification of description. That is, a "field network" in the present description is the concept that can include a "field bus" in addition to a "field network" in a narrow sense.

The control operation executed in the control device 100 includes a process (input process) of collecting data (referred to as "input data" hereinafter) collected or generated in the field device 500, a process (operation process) of generating data (referred to as "output data" hereinafter) such as a command and the like for the field device 500, a process (output process) of transmitting generated output data to a target field device 500, and the like.

It is desirable that the field network 2 employ a bus or a network through which fixed-cycle communication that guarantees a data arrival time is performed. As such a bus or network through which fixed-cycle communication is preformed, EtherCat (registered trademark), EtherNet/IP (registered trademark), DeviceNet (registered trademark), ComPoNet (registered trademark) and the like are known.

Any field device 500 can be connected to the field network 2. The field device 500 includes an actuator which applies a certain physical action to a manufacturing apparatus, a production line or the like (collectively referred to as a "field" hereinafter), an input/output device which exchanges information with a field, and the like.

While data is exchanged between the control device 100 and the field device 500 through the field network 2, such exchanged data is updated in a very short periods in the order of several hundreds of μsec to several tens of msec. Meanwhile, a process of updating the exchanged data is also referred to as an input/output refresh process.

In the configuration example illustrated in FIG. 2, the field device 500 includes a remote input/output (I/O) device 510, a servo driver 520, a servo motor 522, and a CNC processing device 530. The field device 500 is not limited to such devices and can employ any device which collects input data (e.g., a visual sensor and the like), any device which applies a certain action according to output data (e.g., an inverter device and the like), various robots, and the like.

The remote I/O device 510 typically includes a communication coupler which performs communication through the field network 2, and an input/output unit (referred to as an "I/O unit" hereinafter) for acquiring input data and outputting output data.

Devices which collect input data, such as an input relay and various sensors (e.g., an analog sensor, a temperature sensor, a vibration sensor, etc.), and devices which apply a certain action to fields, such as an output relay, a contactor, a servo driver, any actuator, and the like are connected to the remote I/O device 510.

The servo driver 520 drives the servo motor 522 according to output data (e.g., a position command, a speed command and the like) from the control device 100.

The CNC processing device 530 processes any target by controlling a machining sensor and the like according to a program which designates a position, a speed and the like. The CNC processing device 530 typically includes processing devices such as a lathe processing machine, a milling machine, an electric discharge machine and the like.

The control device 100 is also connected to other devices through a higher-level network 6. Ethernet (registered trademark) and EtherNet/IP (registered trademark) which are general network protocols may be employed as the higher network 6. More specifically, one or more server devices 300 and one or more display devices 400 may be connected to the higher-level network 6.

As the server device 300, a database system, a manufacturing execution system (MES) and the like may be conceived. The manufacturing execution system acquires information from manufacturing apparatuses and equipment corresponding to control targets and monitors and manages the overall production and can handle order information, quality information, shipping information and the like. Devices connected to the higher-level network 6 are not limited to the aforementioned devices and devices providing an information system service may be connected to the higher-level network 6. As the information system service, a process of acquiring information from a manufacturing apparatus and equipment corresponding to control targets and performing macro or micro analysis and the like may be conceived. For example, data mining for extracting some characteristic trends included in information from a manufacturing apparatus and equipment corresponding to control targets, a machine learning tool for performing machine learning based on information from equipment and a machine corresponding to control targets, and the like may be conceived.

The display device 400 receives a manipulation from a user, outputs a command and the like in response to the user manipulation to the control device 100, and graphically displays operation results and the like obtained from the control device 100.

A support device 200 may be connected to the control device 100. The support device 200 is a device supporting preparation necessary for the control device 100 to control a control target. Specifically, the support device 200 provides a development environment for programs executed in the control device 100 (a program creating and editing tool, a parser, a compiler and the like), a setting environment for setting parameters (configurations) of the control device 100 and various devices connected to the control device 100, a function of outputting a generated user program to the control device 100, a function of correcting and changing the user program and the like executed in the control device 100 online, and the like.

C. Example of Hardware Configuration of Control Device

Next, an example of a hardware configuration of the control device 100 according to the present embodiment will be described.

Figure 3:
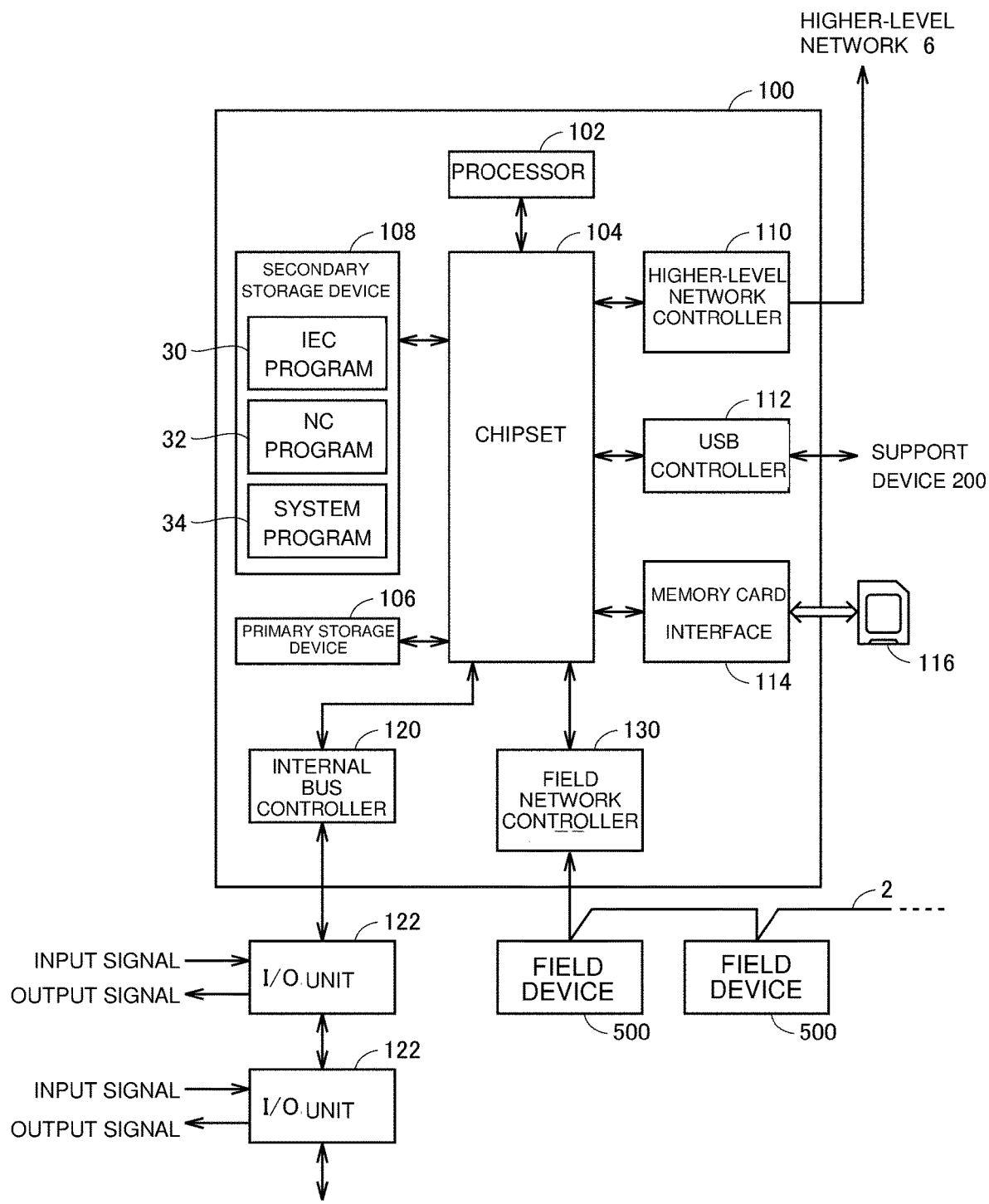
FIG. 3 is a block diagram illustrating an example of a hardware configuration of the control device according to the present embodiment.

FIG. 3 is a block diagram illustrating an example of the hardware configuration of the control device 100 according to the present embodiment. Referring to FIG. 3, the control device 100 is an operation processing part called a CPU and includes a processor 102, a chipset 104, a primary storage device 106, a secondary storage device 108, a higher-level network controller 110, a universal serial bus (USB) controller 112, a memory card interface 114, an internal bus controller 120, and a field network controller 130.

The processor 102 comprises a central processing unit (CPU), a micro-processing unit (MPU), a graphics processing unit (GPU) or the like. The processor 102 may employ a configuration having a plurality of cores, or a plurality of processors 102 may be provided. The chipset 104 controls the processor 102 and peripheral elements and realizes the process of the entire control device 100. The primary storage device 106 comprises a volatile storage device such as a dynamic random access memory (DRAM), a static random access memory (SRAM) or the like. The secondary storage device 108 comprises a non-volatile storage device, for example, a hard disk drive (HDD), a solid state drive (SSD) or the like.

The processor 102 reads various programs stored in the secondary storage device 108, develops the read programs in the primary storage device 106 and executes the programs. The processor 102 realizes control according to a control target and various processes as will be described later. The secondary storage device 108 stores user programs (an IEC program 30 and an NC program 32) created according to a manufacturing apparatus and equipment corresponding to control targets in addition to a system program 34 for realizing basic functions.

The higher-level network controller 110 controls exchange of data between the server device 300 and the display device 400 (refer to FIG. 3) or the like through the higher network 6. The USB controller 112 controls exchange of data with the support device 200 through USB connection.

The memory card interface 114 is configured in such a manner that a memory card 116 is detachably attached thereto, data can be written into the memory card 116, and various types of data (user programs, trace data and the like) can be read from the memory card 116.

The internal bus controller 120 controls exchange of data with the I/O unit 122 included in the control device 100. The field network controller 130 controls exchange of data with a field device through the field network 2.

Although a configuration example in which the processor 102 executes programs to provide necessary functions is illustrated in FIG. 3, some or all of the provided functions may be implemented using a dedicated hardware circuit (e.g., ASIC, FPGA or the like). Alternatively, principal parts of the control device 100 may be realized using hardware according to a general-purpose architecture (e.g., an industrial personal computer based on a general-purpose personal computer). In this case, it is possible to execute a plurality of operating systems (OSs) having different usages in parallel and execute a required application in each OS using a virtualization technique.

Although the control device 100, the support device 200 and the display device 400 are configured as individual bodies in the control system 1 illustrated in FIG. 3, a configuration in which all or some of such functions are integrated into a single device may be employed.

D. Example of Functional Configuration of Control Device

Next, an example of a functional configuration of the control device 100 according to the present embodiment will be described.

Figure 4:
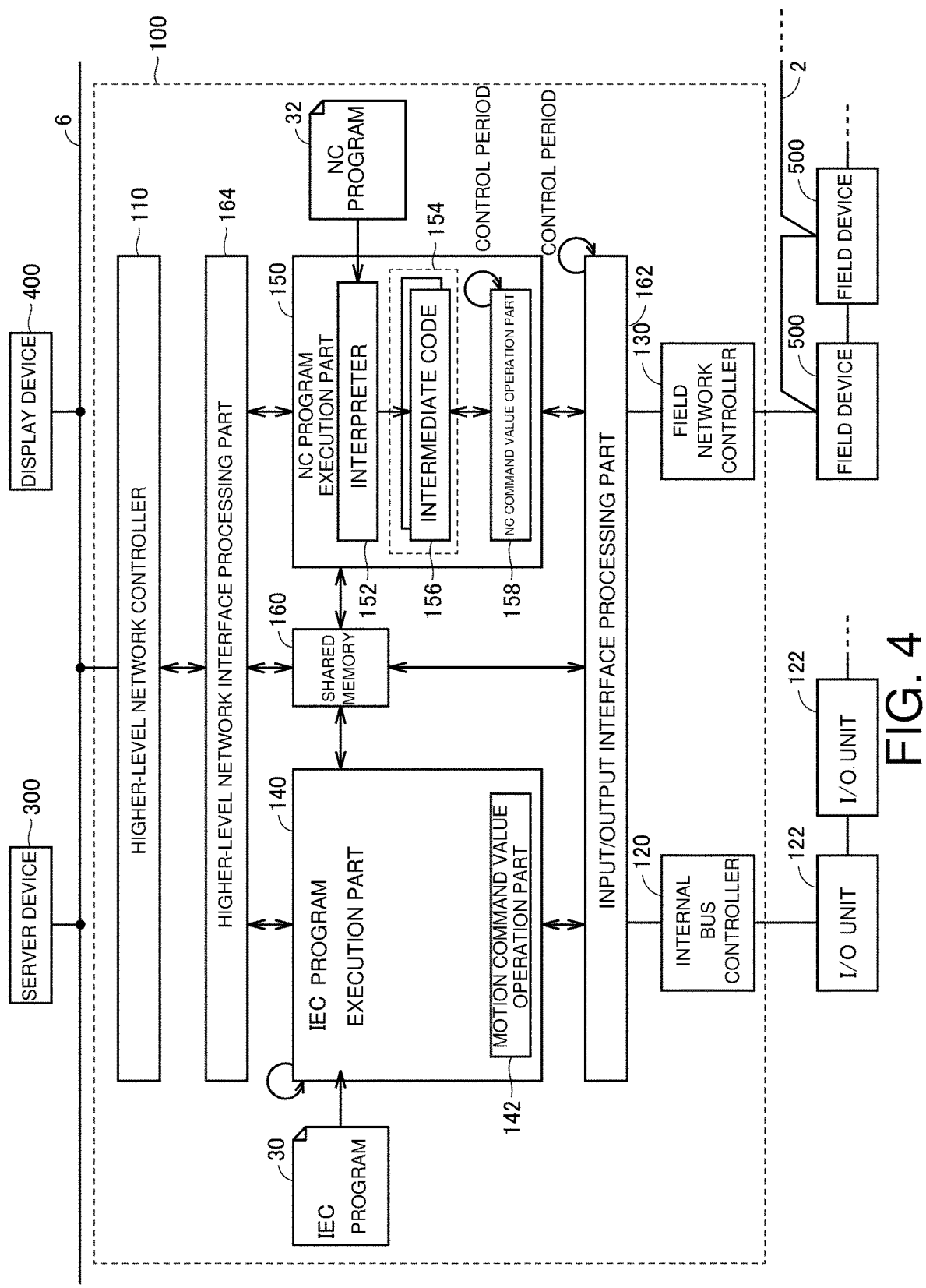
FIG. 4 is a schematic diagram illustrating an example of a functional configuration of the control device according to the present embodiment.

FIG. 4 is a schematic diagram illustrating an example of the functional configuration of the control device 100 according to the present embodiment. Referring to FIG. 4, the control device 100 includes an IEC program execution part 140, an NC program execution part 150, a shared memory 160, an input/output interface processing part 162, and a higher-level network interface processing part 164 as functional components according to program execution.

The IEC program execution part 140 is equivalent to the first program execution part which scans the entire IEC program 30 (first program) in each control cycle to update a command value. That is, the IEC program execution part 140 executes (scans) the IEC program 30 in each predetermined control cycle to update one or more command values. The IEC program 30 may include a sequence instruction and a motion instruction. The sequence instruction defines one or more logical operations including an input value, an output value, an internal value and the like. The motion instruction defines a procedure of calculating command values as numerical values such as a position, a velocity, an acceleration, a jerk, an angle, an angular velocity, an angular acceleration, and an angular jerk for an actuator such as a servo motor or the like.

The IEC program execution part 140 executes the entire IEC program 30 in each control cycle. That is, the IEC program execution part 140 executes the IEC program 30 from the beginning to the end in one control cycle to update command values in each control cycle. However, a motion instruction may calculate command values over a plurality of control cycles according to one command. The IEC program execution part 140 includes a motion command value operation part 142 for executing such a motion instruction.

The motion command value operation part 142 calculates a command value according to a motion instruction in each control cycle.

In this manner, the IEC program execution part 140 executes the IEC program 30 in each control cycle using input data in the corresponding control cycle to calculate command values in the corresponding control cycle.

The NC program execution part 150 is equivalent to the second program execution part which updates a command value according to the sequentially interpreted NC program 32 (second program) in each control cycle. More specifically, the NC program execution part 150 executes the NC program 32 in an interpreter manner. Here, calculation (update) of a command value performed by the NC program execution part 150 is repeatedly executed in each control cycle. In this manner, the NC program execution part 150 calculates a command value according to the NC program 32 in synchronization with calculation of a command value performed by the IEC program execution part 140. To realize calculation of a command value in each control cycle, the NC program execution part 150 includes an interpreter 152, an intermediate code buffer 154, and an NC command value operation part 158.

The interpreter 152 interprets at least part of the NC program 32 to generate the intermediate code 156. That is, the interpreter 152 generates the intermediate code 156 by sequentially interpreting the NC program 32 and sequentially stores generated intermediate codes 156 in the intermediate code buffer 154. The interpreter 152 performs generation of the intermediate code 156 from the NC program 32 in advance to some degree. Accordingly, a plurality of intermediate codes 156 may be stored in the intermediate code buffer 154. In embodiments, the interpreter 152 generates a trajectory for calculating a command value and thus may be called a "planner."

The NC command value operation part 158 calculates a command value in each control cycle according to the intermediate code 156 generated by the interpreter 152 in advance. Although instructions (codes) described in the NC program are sequentially interpreted in general and thus calculation of a command values in each control cycle cannot be guaranteed, calculation of a command value in each control cycle can be realized by using the intermediate code 156.

The interpreter 152 sequentially queues generated intermediate codes 156 in the intermediate code buffer 154, and the NC command value operation part 158 reads the intermediate codes 156 in the order of being queued in the intermediate code buffer 154.

The shared memory 160 provides a storage region in which internal variables and the like used for a control operation are stored and is accessible by any one of the IEC program execution part 140 and the NC program execution part 150. That is, the shared memory 160 stores one or more command values updated in each control cycle by the IEC program execution part 140 and one or more command values updated in each control cycle by the NC program execution part 150. The shared memory 160 is used for the NC program execution part 150 (NC command value operation part 158) to refer to a command value calculated in each control cycle by the IEC program execution part 140 and also used for the IEC program execution part 140 to refer to a command values calculated in each control cycle from the NC program execution part 150.

More specifically, some or all of processing results of the NC program execution part 150 are stored in the shared memory 160, and the IEC program execution part 140 can refer to data stored in the shared memory 160. Further, some or all of processing results of the IEC program execution part 140 are stored in the shared memory 160, and the NC program execution part 150 can refer to data stored in the shared memory 160. In this manner, the IEC program execution part 140 and the NC program execution part 150 (NC command value operation part 158) output command values in each control cycle in a manner in which the command values can be used in other processes. Meanwhile, when data is stored in the shared memory 160, structure variables may be employed.

The input/output interface processing part 162 is equivalent to a data update part which updates input data and output data in each control cycle. That is, the input/output interface processing part 162 is a functional component for realizing the input/output refresh process and exchanges input data and output data with the I/O unit 122 connected through the internal bus controller 120 and/or the field device 500 connected through the field network controller 130. This exchanged data is updated in a very short periods (a fixed cycle) in the order of several hundreds of μsec to several tens of msec.

More specifically, the input/output interface processing part 162 outputs one or more command values (basically logical values) calculated by the IEC program execution part 140, one or more command values (basically numerical values) calculated by the motion command value operation part 142 of the IEC program execution part 140, and one or more command values (basically numerical values) calculated by the NC command value operation part 158 of the NC program execution part 150 to a field side in each control cycle. In addition, the input/output interface processing part 162 acquires input data collected by the I/O unit 122 and input data collected by the field device 500 in each control cycle.

The control device 100 receives indication of initiation/termination of production from the server device 300 and the like connected through the higher-level network 6. The server device 300 may transmit recipe information (information such as parameters suited to production) and the like to the control device 100 and download the NC program to the control device 100.

The higher-level network interface processing part 164 mediates exchange of data between the IEC program execution part 140 and the NC program execution part 150 and devices (the server device 300 and the display device 400) connected through the higher-level network controller 110.

Although FIG. 4 illustrates a configuration example in which only one NC program execution part 150 is provided for convenience of description, the disclosure is not limited thereto and a plurality of NC program execution parts 150 may be provided. In this case, the NC program execution parts 150 independently interpret and execute the NC program.

Although the IEC program execution part 140 and the NC program execution part 150 calculate command values in each control cycle in the above description, a program executed in a longer period than the control cycle may be present. For example, such a program is called a system service or the like. This system service is executed in spare time in which no tasks are being executed. Here, update of input data and output data is executed at the timing of an input/output refresh process repeatedly executed in each control cycle. Typically, update of input data and output data with respect to the system service may be executed in each integer multiple of the control cycle.

E. Intermediate Code

Next, an example of an intermediate code generated by interpreting the NC program 32 by the interpreter 152 of the NC program execution part 150 will be described.

Figure 5:
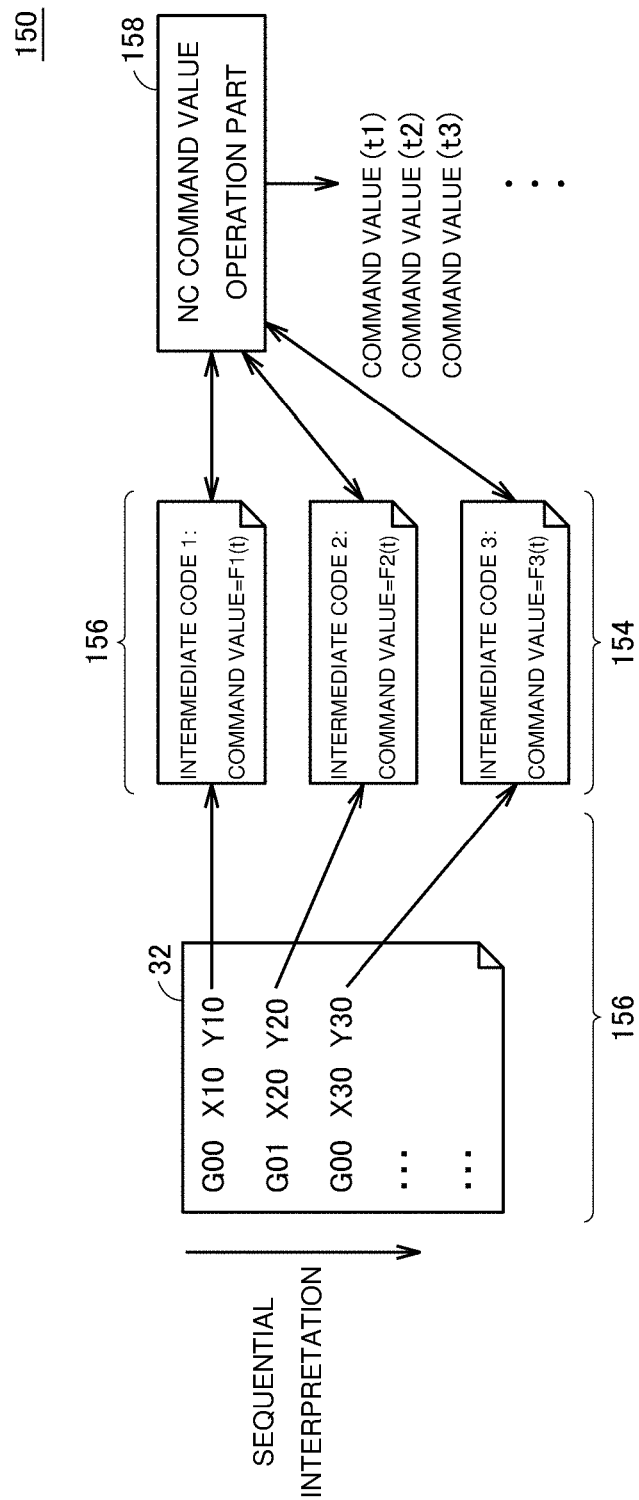
FIG. 5 is a schematic diagram conceptually illustrating a process of executing an NC program in the control device according to the present embodiment.

FIG. 5 is a schematic diagram conceptually illustrating a process of executing the NC program 32 in the control device 100 according to the present embodiment. Referring to FIG. 5, the NC program 32 is sequentially interpreted in the NC program execution part 150 and then a command value of each control cycle is calculated.

The NC program 32 generally includes codes sequentially interpreted in an interpreter manner, and a time required when the codes are sequentially interpreted changes according to details described by the codes. That is, the codes are sequentially interpreted in the interpreter manner and thus it is difficult to calculate a command value in each control cycle.

Accordingly, in the control device 100 according to the present embodiment, the interpreter 152 of the NC program execution part 150 interprets one or more codes described in the NC program 32 and generates the intermediate code 156 for calculating a command value in each control cycle based on the interpreted details. Since the intermediate code 156 is generated for each of one or more codes described in the NC program 32, a plurality of intermediate codes 156 are usually generated from a single NC program 32.

The generated intermediate codes 156 are sequentially queued in the intermediate code buffer 154 of the NC program execution part 150.

In each intermediate code 156, a function which can calculate a command value using a variable with respect to time as an input may be defined. That is, the intermediate code 156 may be a function through which the NC command value operation part 158 of the NC program execution part 150 updates a command value in each control cycle. By using such a function, the NC command value operation part 158 can calculate a command value in each control cycle by sequentially referring to generated intermediate codes 156.

More specifically, the intermediate code 156 may be a function which defines a relationship between time and a command value. As variables with respect to time for defining the intermediate code 156, a time, a time elapsed from a certain reference timing, the number of cumulative cycles of a control cycle, and the like may be used.

For example, when the first intermediate code 1 defines command values for the duration corresponding to ten times the control cycle, the NC command value operation part 158 of the NC program execution part 150 queues the intermediate code 1 and periodically calculates command values for the duration corresponding to 10 control cycles. In the same manner, command values can also be calculated for a plurality of control cycles basically with respect to other intermediate codes 2 and 3.

Accordingly, if the process of generating intermediate codes from the NC program 32 is executed by the interpreter 152 of the NC program execution part 150 sufficiently prior to the process of calculating a command value performed by the NC command value operation part 158 of the NC program execution part 150, the process according to the NC program 32 can be executed in synchronization with the process according to the IEC program 30.

FIGS. 6A and 6B are schematic diagrams for describing an example of generating intermediate codes in the control device 100 according to the present embodiment. Referring to FIG. 6A, when the interpreter 152 of the NC program execution part 150 sequentially executes the NC program 32, each instruction included in the NC program 32 is interpreted ((1) program interpretation). A defined trajectory is internally generated according to such instruction interpretation ((2) trajectory generation). Finally, the interpreter 152 divides the generated trajectory into predetermined sections and then generates one or more functions (intermediate codes) which define the trajectory of each section ((3) intermediate code generation).

Meanwhile, a plurality of sections may be defined with a common intermediate code or one section may be further divided and a common code for each divided section may be generated. That is, the number of instructions of the NC program 32 or sections of a trajectory defined by the instructions need not correspond to the number of generated intermediate codes, and intermediate codes may be arbitrarily generated. In addition, an output form of the intermediate codes 156 may be appropriately designed in consideration of the duration of a required control cycle, and the like.

Figure 6:
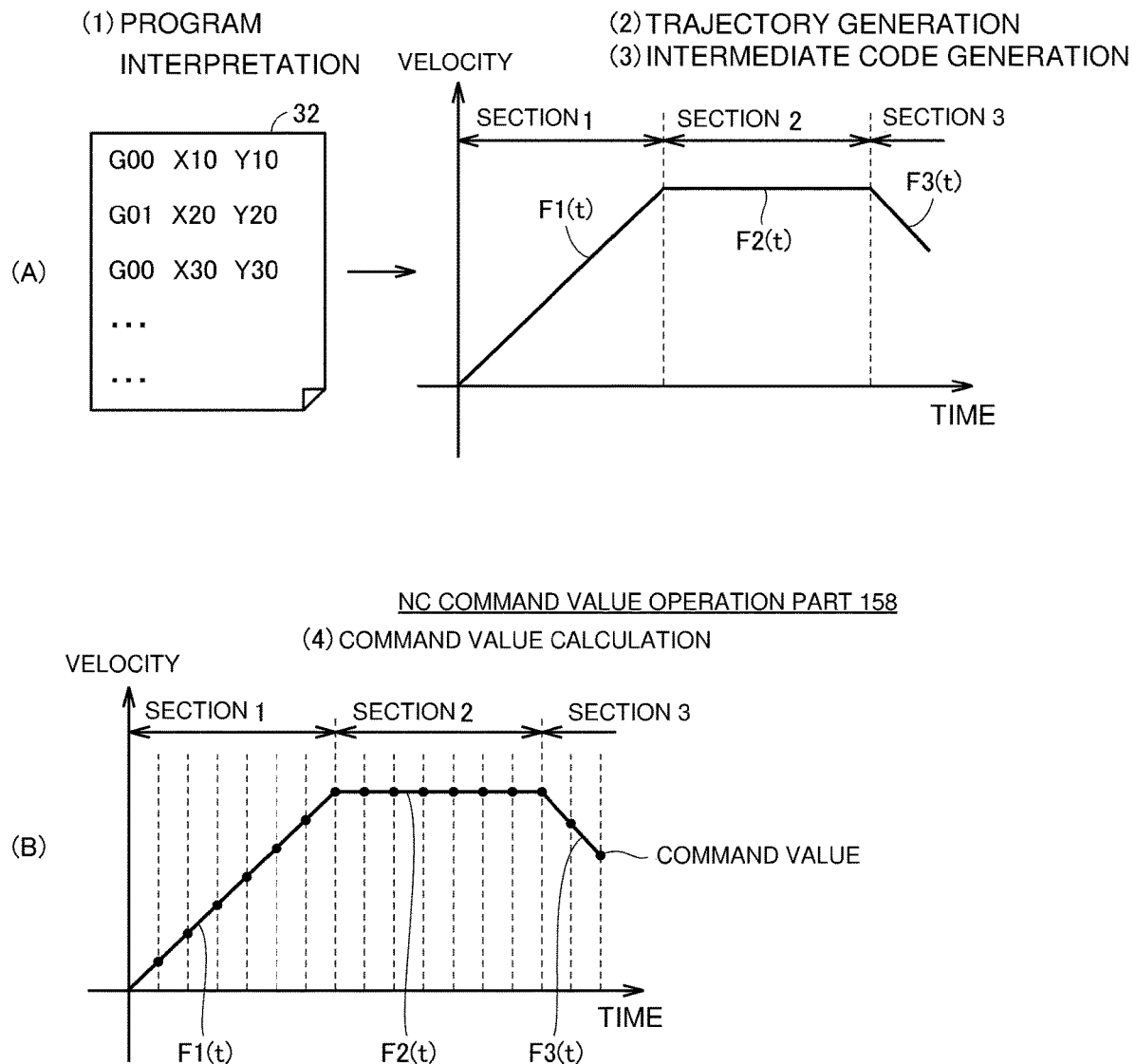
FIG. 6 shows (A) and (B) parts that are schematic diagrams showing an example of generating an intermediate code in the control device according to the present embodiment.

As shown in (A) part of FIG. 6, a function that defines a relationship between time and a command value may be an example of the intermediate code 156. In the example illustrated in FIG. 6A, the internally generated trajectory can be defined using a combination of straight lines, and thus functions $F1(t)$, $F2(t)$ and $F3(t)$ that indicate the trajectory of each straight-line section (section 1 to section 3) as a relationship between time and velocity are output as an example.

As shown in (B) part of FIG. 6, the NC command value operation part 158 of the NC program execution part 150 calculates a command value according to the generated intermediate codes 156 in each control cycle, and thus the command value is calculated in each control cycle. That is, the time of each control cycle is input to the function corresponding to each section and thus command values at the time can be uniquely determined.

Although FIG. 5 and FIG. 6 illustrate an example of codes described in G language used in CNC, the disclosure is not limited thereto and any language may be used if the program is a program executed in any interpreter manner. Further, the format of a generated intermediate code may be different according to the language format of a processing target.

F. Example of Operation of Executing Program

Next, an example of an operation of executing a program in the control device 100 according to the present embodiment will be described.

Figure 7:
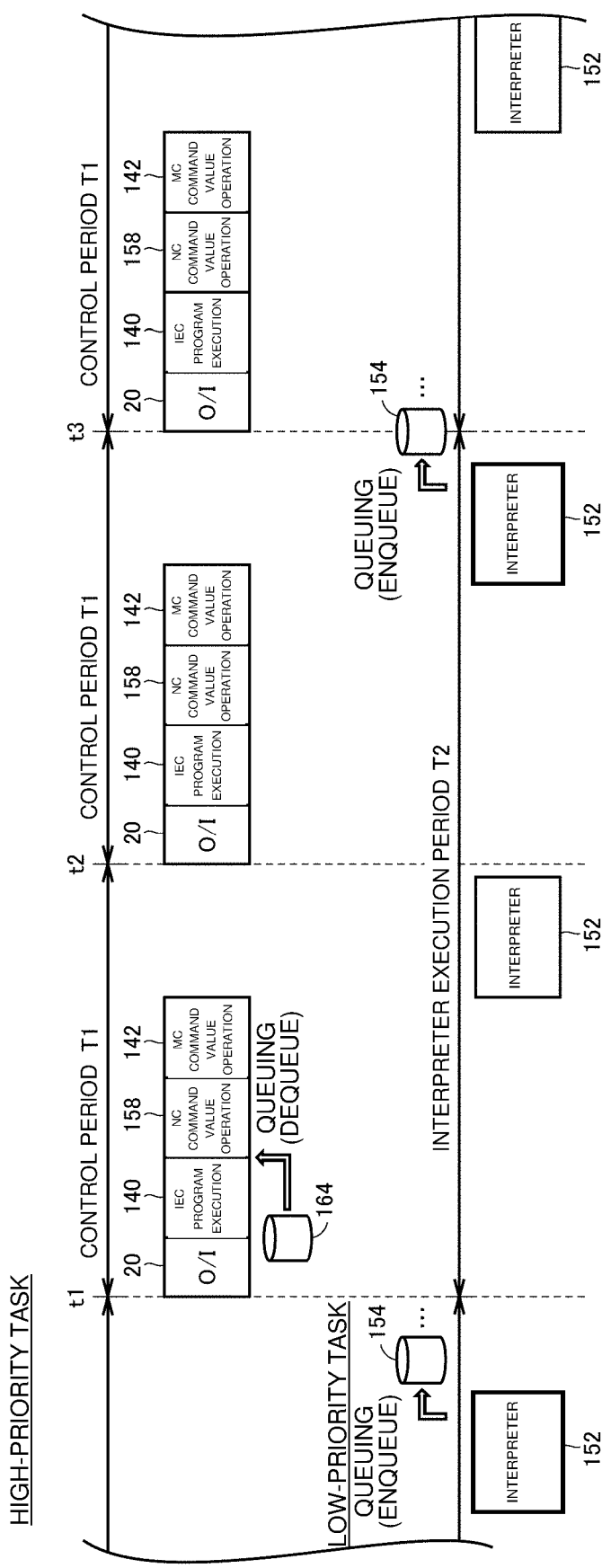
FIG. 7 is a time chart illustrating an example of an operation of executing a program in the control device according to the present embodiment.

FIG. 7 is a time chart illustrating an example of the operation of executing a program in the control device 100 according to the present embodiment. FIG. 7 shows an example in which a plurality of tasks are set for priorities and each task shares resources of the processor 102 in response to each priority.

In the example illustrated in FIG. 7, four processes, that is, (1) an input/output refresh process 20 executed by the input/output interface processing part 162, (2) execution of the IEC program 30 performed by the IEC program execution part 140, (3) a process of calculating a command value performed by the NC command value operation part 158 of the NC program execution part 150 and (4) a process of calculating a command value performed by the motion command value operation part 142 of the IEC program execution part 140 are set as high-priority tasks.

In addition, it is assumed that sequential interpretation of the NC program 32 performed by the interpreter 152 of the NC program execution part 150 is set as a low-priority task.

The high-priority tasks are repeatedly executed in each predetermined control cycle T1. The low-priority task is appropriately executed in a period in which a high-priority task is not executed. That is, the execution time of the high-priority tasks is allocated to each control cycle and the low-priority tack is executed in a time other than the execution time of the high-priority task.

First, high-priority tasks will be described. When each control cycle is arrived, the input/output refresh process 20 is executed first, and then the IEC program execution part 140 executes (scans) the entire IEC program 30 to calculate one or more command values according to a sequence instruction. In addition, the NC command value operation part 158 of the NC program execution part 150 reads (dequeues) an intermediate code 156 from the intermediate code buffer 154 and calculates a command value in the corresponding control cycle. In addition, the motion command value operation part 142 of the IEC program execution part 140 calculates one or more command values with respect to a motion instruction included in the IEC program 30 according to the motion instruction. The same process is repeated in each control cycle.

Meanwhile, a timing (dequeuing timing) at which the NC command value operation part 158 reads the intermediate code 156 from the intermediate code buffer 154 may not be each control cycle. This is because the read intermediate code includes an instruction that can only calculate command values over a plurality of control cycles in many cases.

When execution of the high-priority tasks in a certain control cycle is completed in this manner, a set of command values according to the sequence instruction, command values according to the motion instruction and command values with respect to a control application is prepared. These command values are basically applied to the field side when the next control cycle is arrived. That is, the IEC program execution part 140 and the NC program execution part 150 calculate command values in response to input data in the same control cycle and thus can realize output synchronized with input.

Although FIG. 7 illustrates an example in which execution of the IEC program 30, the process of calculating a command value performed by the NC command value operation part 158, and the process of calculating a command value performed by the motion command value operation part 142 are executed in order for convenience of description, the execution order may be appropriately changed or each process may be further subdivided and alternately executed. That is, it is desirable that data to be output as external data including command values can be calculated between termination of execution of the preceding input/output refresh process 20 and initiation of execution of the next input/output refresh process 20.

On the other hand, with respect to the low-priority task, the interpreter 152 of the NC program execution part 150 sequentially interprets the NC program 32. That is, the interpreter 152 of the NC program execution part 150 executes reading and interpretation of the NC program 32 with low priority. Intermediate codes generated through the process of interpreting the NC program 32 performed by the interpreter 152 are sequentially queued (enqueued) in the intermediate code buffer 154. The intermediate codes queued in the intermediate code buffer 154 are referred to by the NC command value operation part 158 of the NC program execution part 150 every time and used for generation of command values.

The interpreter 152 of the NC program execution part 150 can realize calculation of a command value in each control cycle, which is performed by the NC command value operation part 158 of the NC program execution part 150, by queuing intermediate codes corresponding to an integer multiple of a control cycle which is an operation period of a high-priority task in advance.

The interpreter 152 of the NC program execution part 150 may sufficiently excessively generate intermediate codes to be referred to by the NC command value operation part 158 of the NC program execution part 150 for calculation of command values by interpreting the NC program 32 in advance.

The interpreter 152 of the NC program execution part 150 performs a data synchronization process with the IEC program execution part 140 in each predetermined interpreter control cycle T2 (basically an integer multiple of the control cycle T1). Accordingly, the interpreter 152 reads and interprets only codes that can be processed within the interpreter control cycle T2 among codes included in the NC program 32 in each program execution operation.

As shown in FIG. 7, all of execution of the IEC program 30 performed by the IEC program execution part 140, the process of calculating a command value performed by the NC command value operation part 158 of the NC program execution part 150, and the process of calculating a command value performed by the motion command value operation part 142 of the IEC program execution part 140 are executed in each control cycle as high-priority tasks, and thus the tasks can reflect operation results each other in each control cycle.

For example, command values calculated through execution of the IEC program 30 in a certain control cycle can be reflected in command values calculated by the NC command value operation part 158 in the same control cycle. In addition, command values calculated through execution of the IEC program 30 in a certain control cycle and command values calculated by the NC command value operation part 158 in the same control cycle can be transmitted to the external server device 300 and the like as the same data set.

In this manner, the process of calculating a command value in each control cycle is executed with respect to any one of the repeatedly executed (scanned) IEC program 30 and the sequentially interpreted NC program 32 in the control device 100 according to the present embodiment, and thus it is possible to easily perform processes in which such two different programs refer to operation results each other and a process of integrating operation results output from the programs.

Hereinafter, some application examples using the operation of execution a program in the control device 100 according to the present embodiment as illustrated in FIG. 7 will be described.

G. Application Example 1

Next, an example of a process of performing dynamic correction on a command value calculated according to the NC program 32 will be described as an application example in the control device 100 according to the present embodiment.

(g1: Example of Overall Configuration of Control System)

Figure 8:
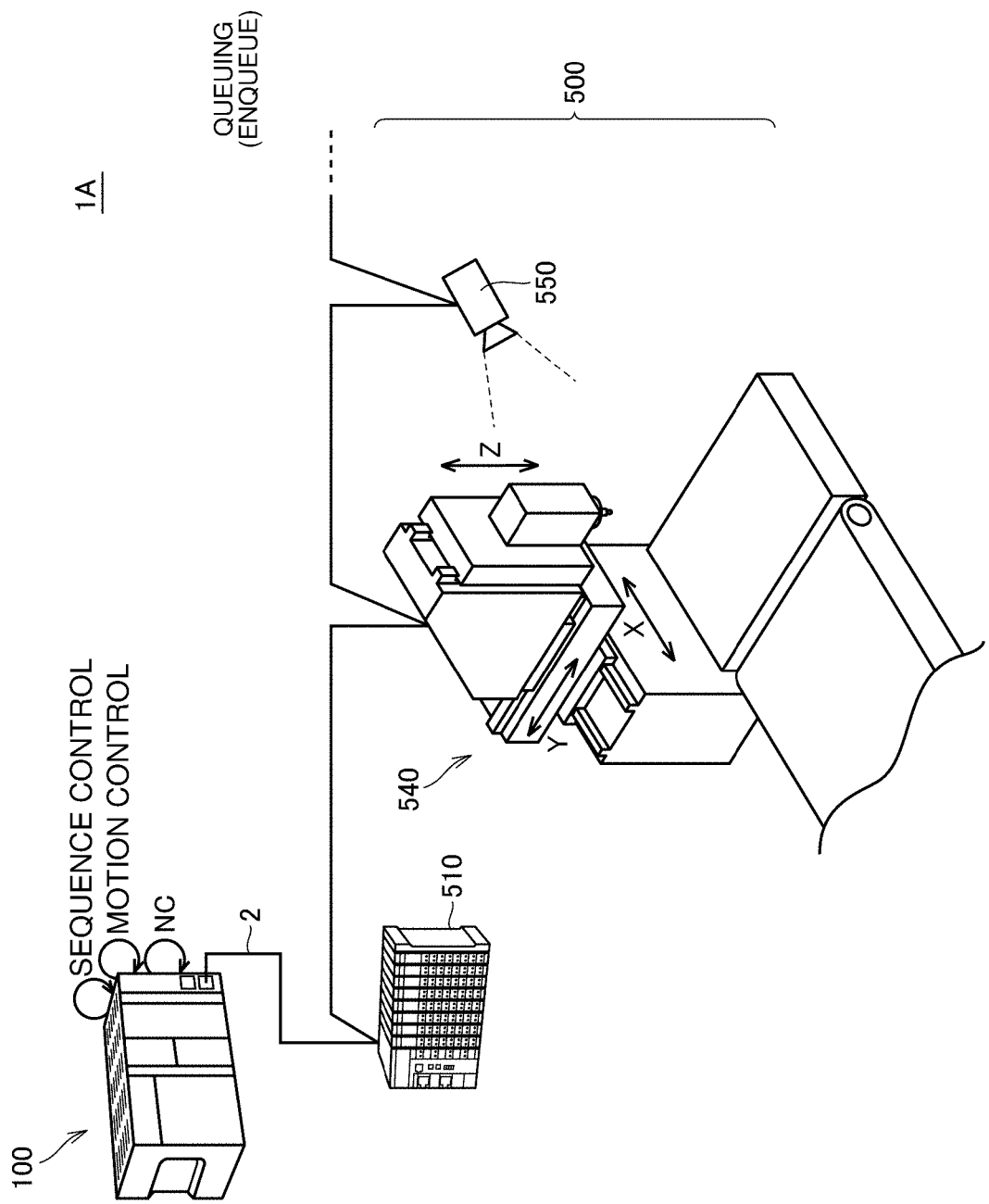
FIG. 8 is a schematic diagram illustrating an example of the overall configuration of a control system including the control device according to the present embodiment.

FIG. 8 is a schematic diagram illustrating an example of the overall configuration of a control system 1A including the control device 100 according to the present embodiment. Referring to FIG. 8, the control device 100 is connected to the remote I/O device 510, the CNC processing device 540 and the visual sensor 550 through the field network 2. These devices are examples of the field device 500.

The CNC processing device 540 is a device performing arbitrary processing on workpieces conveyed by a conveyor or the like and operates according to a command value calculated in each control cycle in the control device 100.

The visual sensor 550 is arranged to include a processing member (e.g., a cutting tool) of the CNC processing device 540 within the field of view and can detect the position or displacement of the processing member according to image recognition processing, for example. Information indicating the position or displacement detected by the visual sensor 550 is accessible by the control device 100.

For example, in a case in which a position deviation of the processing member of the CNC processing device 540 occurs during processing, and the like, there is a need to arrange the processing member at an appropriate position. In general, the CNC processing device 540 is controlled to operate along a trajectory previously defined by the NC program 32. Accordingly, it is not easy to perform correction for external disturbance which can occur during operation.

On the other hand, in the control system 1A including the control device 100 according to the present embodiment, dynamic correction in each control cycle can be performed for external disturbance which can occur in the CNC processing device 540. That is, it is possible to appropriately correct a position deviation or the like of the processing member of the CNC processing device 540.

(g2: Control Structure)

Figure 9:
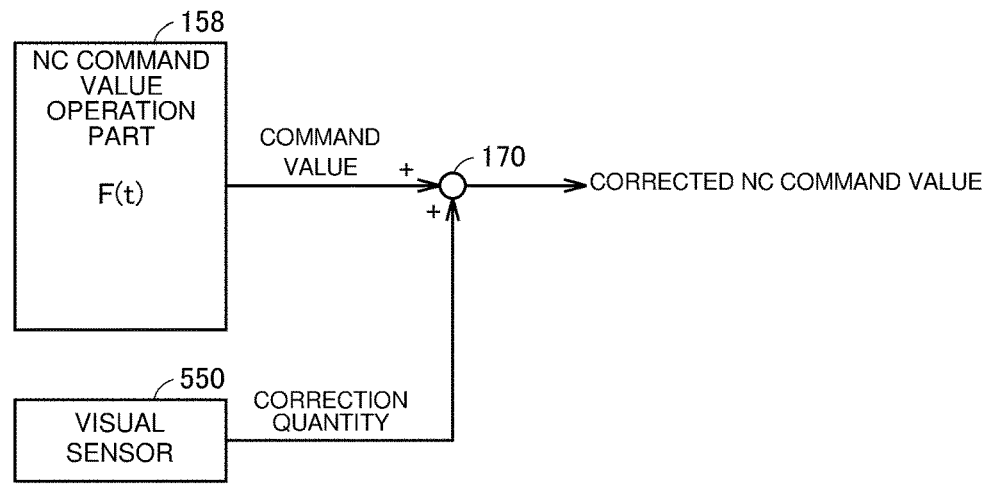
FIG. 9 is a schematic diagram illustrating principal parts of a control structure in the control system illustrated in FIG. 8.

FIG. 9 is a schematic diagram illustrating principal parts of a control structure in the control system 1A illustrated in FIG. 8. Referring to FIG. 9, the NC command value operation part 158 outputs a command value in each control cycle and the visual sensor 550 outputs a correction quantity in each control cycle. Meanwhile, the correction quantity is not calculated by the visual sensor 550 and may be calculated according to operation processing executed in the control device 100.

In an addition part 170, the correction quantity from the visual sensor 550 is added to the command value from the NC command value operation part 158 to calculate a corrected command value. This corrected command value is applied to the CNC processing device 540.

In this manner, operation processing based on the command value calculated by the NC command value operation part 158 in each control cycle and data (input data/output data) updated through the input/output refresh process can be executed in the control device 100. As illustrated in FIG. 9, although numerical value processing for the command value calculated by the NC command value operation part 158 in each control cycle is employed as the correction process, the correction process is not limited thereto and logical processing, conditional judgment processing and the like can be applied.

As described above, since calculation of a command value performed by the NC command value operation part 158 of the NC program execution part 150 is repeated in each control cycle, the command value correction process shown in FIG. 9 can be executed in each control cycle. That is, a command value applied to the CNC processing device 540 can be dynamically corrected in each control cycle.

More accurate processing and the like can be realized according to the aforementioned dynamic correction in each control cycle. Meanwhile, although the process of adding the correction quantity output from the visual sensor 550 is exemplified in the above description, the disclosure is not limited thereto and any correction process using any correction quantity can be applied.

(g3: Example of Program Code)

The control structure shown in FIG. 9 may be realized by combining the IEC program 30 executed in the IEC program execution part 140 and additional processing executed through the NC command value operation part 158 of the NC program execution part 150 or may be integratively described in the IEC program 30. As an example, a case in which the control structure is integratively described in the IEC program 30 will be described.

Figure 10:
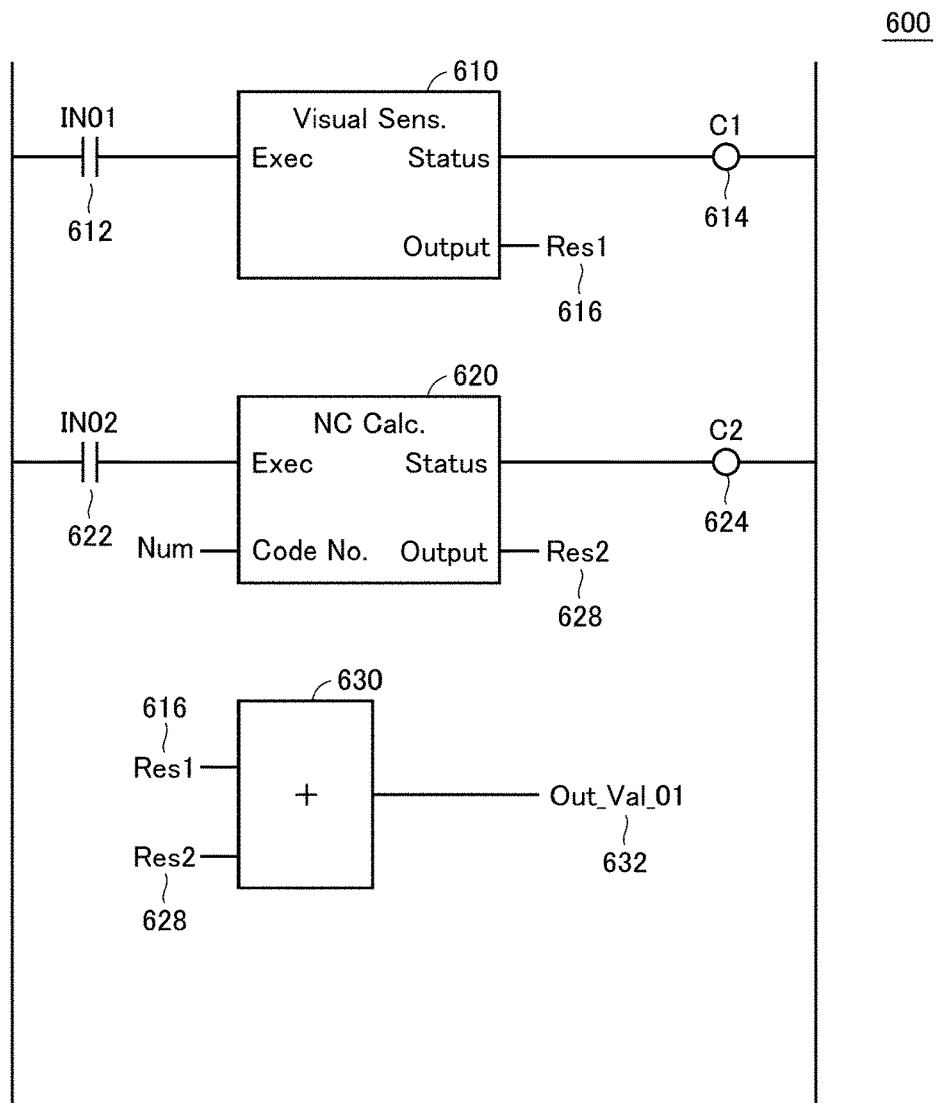
FIG. 10 is a diagram illustrating an example of an IEC program code for realizing the control structure illustrated in FIG. 9.

FIG. 10 is a diagram illustrating an example of an IEC program code for realizing the control structure illustrated in FIG. 9. Referring to FIG. 10, an IEC program code 600 includes a function block 610 for acquiring a correction quantity from the visual sensor 550, a function block 620 for causing the NC program execution part 150 to execute the NC program 32, and a function block 630 for adding two inputs.

The function block 610 is defined having a certain contact 612 (IN01) as an execution condition, and when the contact 612 is driven as "ON," a correction quantity acquired from the visual sensor 550 is stored as a variable 616 (Res1). A value indicating the execution state of the process in the function block 610 is stored in a coil 614 (C1) associated with the function block 610.

The function block 620 is defined having a certain contact 622 (IN02) as an execution condition, and the contact 622 is driven as "ON" to indicate execution of the NC program 32 in the NC program execution part 150. A command value calculated in each control cycle by the NC command value operation part 158 of the NC program execution part 150 is stored as a variable 628 (Res2) associated with an output node of the function block 620.

A value indicating an execution state of the process in the function block 620 is stored in a coil 624 (C2) associated with the function block 620. A variable 626 (Num) associated with the function block 620 specifies the NC program 32 to be executed. That is, the NC program 32 to be executed by the NC command value operation part 158 is specified according to a numerical value or a character stored as the variable 626. A processing process and the like in response to situation can be realized by updating or switching a numerical value or a character stored as the variable 626 according to an appropriate condition.

The function block 630 adds up a variable 616 (Res1) associated with a first input node and a variable 628 (Res1) associated with a second input node to output a final corrected command value 632 (Out_Val01).

The entire IEC program code 600 shown in FIG. 10 can be executed (scanned) in each control cycle to realize correction of a position command in each control cycle as shown in FIG. 9. Meanwhile, it possible to perform execution of the following instruction while waiting for calculation of a command value performed by the NC command value operation part 158 of the NC program execution part 150 when the function block 620 of the IEC program code 600 is executed (g4: Processing Procedure)

Figure 11:
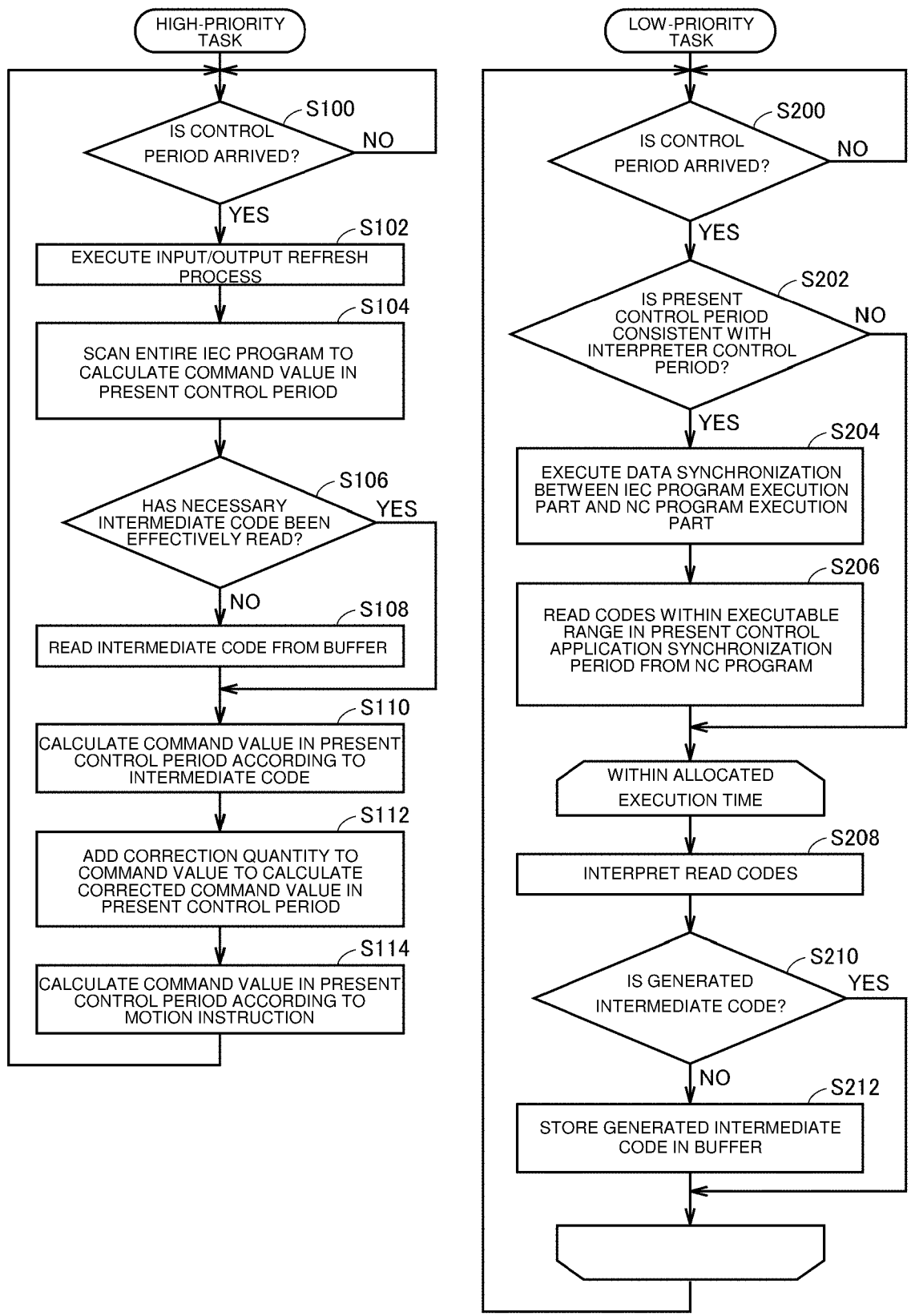
FIG. 11 is a flowchart illustrating a processing procedure executed in the control device of the control system illustrated in FIG. 8.

FIG. 11 is a flowchart illustrating a processing procedure executed in the control device 100 of the control system 1A shown in FIG. 8. FIG. 11 illustrates execution of a high-priority task and execution of a low-priority task.

Referring to FIG. 11, when a control cycle is arrived with respect to the high-priority task (YES in step S100), the input/output interface processing part 162 executes the input/output refresh process (step S102). Accordingly, a command value calculated in the immediately previous control cycle is output to an actuator or the like and input data is acquired from a field.

The IEC program execution part 140 calculates one or more command values in the present control cycle by scanning the entire IEC program 30 (step S104). That is, command values according to a sequence instruction of the IEC program 30 are internally calculated.

The NC command value operation part 158 of the NC program execution part 150 determines whether an intermediate code necessary to calculate command values has been effectively read (step S106). When the intermediate code has not been effectively read (NO in step S106), the NC command value operation part 158 reads the intermediate code from the intermediate code buffer 154 (step S108). When the intermediate code has been effectively read (YES in step S106), the process of step S108 is skipped.

The NC command value operation part 158 of the NC program execution part 150 calculates a command value in the present control cycle according to the intermediate code (step S110). Further, the IEC program execution part 140 adds a correction quantity acquired in the present control cycle to the calculated command value to calculate a corrected command value (step S112). Meanwhile, the process of step S112 may be executed by the NC command value operation part 158. In this manner, a command value according to the NC program 32 is internally calculated.

The motion command value operation part 142 of the IEC program execution part 140 calculates a command value in the present control cycle according to a motion instruction included in the IEC program 30 (step S114).

Meanwhile, execution of the IEC program 30 in step S104 may be interrupted in the process of step S106 to S112.

According to the above-described processes, a command value in the present control cycle is calculated. Then, the processes following step S100 are repeated. That is, when the next control cycle is arrived, the command values calculated in steps S104, S112 and S114 are output to a field. Meanwhile, a low-priority task is executed for a duration between completion of step S112 and arrival of the next control cycle.

On the other hand, a control cycle is arrived with respect to the low-priority task (YES in step S200), it is determined whether the present control cycle is consistent with the interpreter control cycle T2 (step S202). When the present control cycle is consistent with the interpreter control cycle T2 (YES in step S202), data synchronization is executed between the interpreter 152 of the NC program execution part 150 and the IEC program execution part 140 (step S204). In addition, the interpreter 152 of the NC program execution part 150 reads codes within an executable range in the present interpreter control cycle T2 from the NC program 32 (step S206).

When the present control cycle is not consistent with the interpreter control cycle T2 (NO in step S202), the processes of steps S204 and S206 are skipped.

For a duration to which a program execution time is allocated for the low-priority task, the interpreter 152 of the NC program execution part 150 interprets the codes read in step S206 (step S208), and when a certain intermediate code is generated (YES in step S210), stores the generated intermediate code in the intermediate code buffer 154 (step S212). Then, the processes following step S200 are repeated.

That is, within the interpreter control cycle T2, the processes of steps S208 to S212 are repeated for the duration to which the program execution time is allocated for the low-priority task.

(g5: Advantages)

According to the present embodiment, a command value calculated according to the NC program can be corrected using a correction quantity acquired in each control cycle of the control device 100 in the process of generating a command value according to the sequentially interpreted NC program 32.

In a system constructed by combining a machine tool which sequentially interprets an NC program to execute the NC program and a PLC which executes a sequence program in a fixed cycle, a period and timing at which the machine tool calculates a command value does not correspond to a period and timing at which the PLC executes input/output refresh processing, and thus a process of reflecting a correction value in a command value calculated by the machine tool in real time cannot be performed.

On the other hand, in the control device 100 according to the present embodiment, an IEC program including a sequence instruction and a motion instruction is executed in each control cycle, and a command value is calculated with respect to an NC program in each control cycle using an intermediate code. In this manner, calculation of a command value according to the NC program as well as the sequence instruction and the motion instruction can be performed in each control cycle, and thus a command value calculated in each control cycle can be further corrected.

Since it is possible to correct command values in real time using input data collected in each control cycle of the control device 100 while observing the current command trajectory using a camera or the like, as described above, the processing accuracy of a machine tool can be improved.

H. Application Example 2

Next, an example of a process of collecting command values calculated according to the IEC program 30 and the NC program 32 and various types of input/output data will be described as another application example in the control device 100 according to the present embodiment.

(h1: Example of Overall Configuration of Control System)

Figure 12:
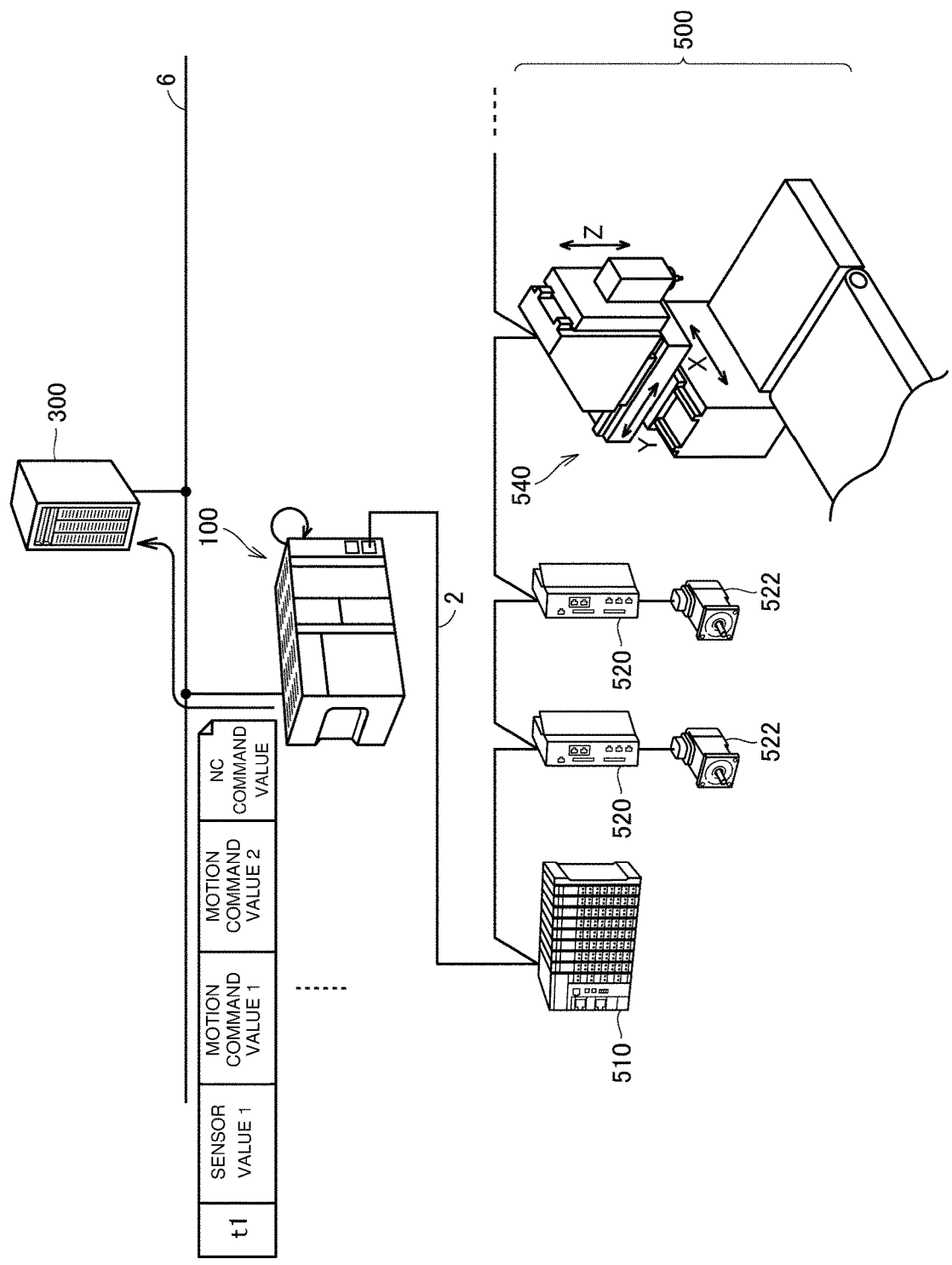
FIG. 12 is a schematic diagram illustrating an example of the overall configuration of a control system including the control device according to the present embodiment.

FIG. 12 is a schematic diagram illustrating an example of the overall configuration of a control system 1B including the control device 100 according to the present embodiment. Referring to FIG. 12, the control device 100 is connected to the remote I/O device 510, the servo driver 520, the servo motor 522, and the CNC processing device 540 through the field network 2. These devices are examples of the field device 500.

The remote I/O device 510 acquires input data from fields and outputs command values calculated in the control device 100 to the fields.

The servo driver 520 drives the servo motor 522 according to command values (e.g., a position command, a velocity command and the like) calculated in the control device 100.

The CNC processing device 540 is a device performing arbitrary processing on workpieces conveyed by a conveyor or the like and operates according to command values calculated in each control cycle in the control device 100.

In this control system 1B, there is a need to collect data managed by the control device 100 for various purposes such as production management, traceability management, abnormality detection, abnormality cause analysis, and various analyses using machine learning and the like. In this case, it is possible to employ manners of transmitting data collected periodically or for each predetermined event in the control device 100 to the higher-level server device 300, storing the data in any storage medium included or attached to the control device 100 and acquiring internal data using a support device or the like.

In any case, data needs to be collected periodically or for each predetermined event and it is important that target data collecting timings correspond to each other.

In the control system 1B including the control device 100 according to the present embodiment, all of command values according to a sequence instruction and a motion instruction and command values according to an NC program are calculated in synchronization with each other in each control cycle, and input data is also updated in each control cycle. Accordingly, any one of input data and output data (command value) can be collected in each control cycle and posteriori analysis can be simplified using a data group collected in this manner.

(h2: Control Structure)

Figure 13:
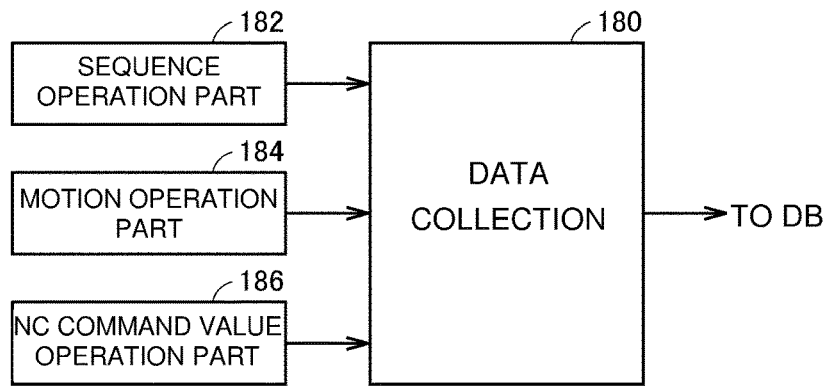
FIG. 13 is a schematic diagram illustrating principal parts of a control structure in the control system illustrated in FIG. 12.

FIG. 13 is a schematic diagram illustrating principal parts of a control structure in the control system 1B illustrated in FIG. 12. Referring to FIG. 13, each of a sequence operation part 182 and a motion operation part 184 outputs at least one of input data and output data (command value) in each control cycle. In addition, an NC command value operation part 186 outputs a calculated command value in each control cycle.

A data collecting part 180 collects data output from the sequence operation part 182, the motion operation part 184 and the NC command value operation part 186 in each control cycle and transmits the collected data to the higher server device 300 and the like.

In this manner, at least one of data (input data/output data) updated through input/output refresh processing and a command value updated by the IEC program execution part 140, and a command value calculated by the NC command value operation part 158 in each control cycle can be generated as a data set in the control device 100. In addition, the data collecting part 180 serves as an output part which outputs the data set generated in each control cycle to the outside.

Meanwhile, transmission of data to the higher-level server device 300 need not be executed in each control cycle, and data collected in a plurality of control cycles may be integrated and transmitted in each period longer than the control cycle. In this case, a task of transmitting the data may be assigned lower priority than that assigned to a task executed in each control cycle. By discriminating priorities in this manner, it is possible to collect and transmit data that enables high-accuracy management without affecting processes executed in each control cycle.

Such data used for different control operations can be synchronized and collected to simplify posteriori analysis.

(h3: Example of Program Code)

The control structure illustrated in FIG. 13 may be realized by combining the IEC program 30 executed in the IEC program execution part 140 and additional processing executed through the NC command value operation part 158 of the NC program execution part 150 or may be integratively described in the IEC program 30. As an example, a case in which the control structure is integratively described in the IEC program 30 will be described.

Figure 14:
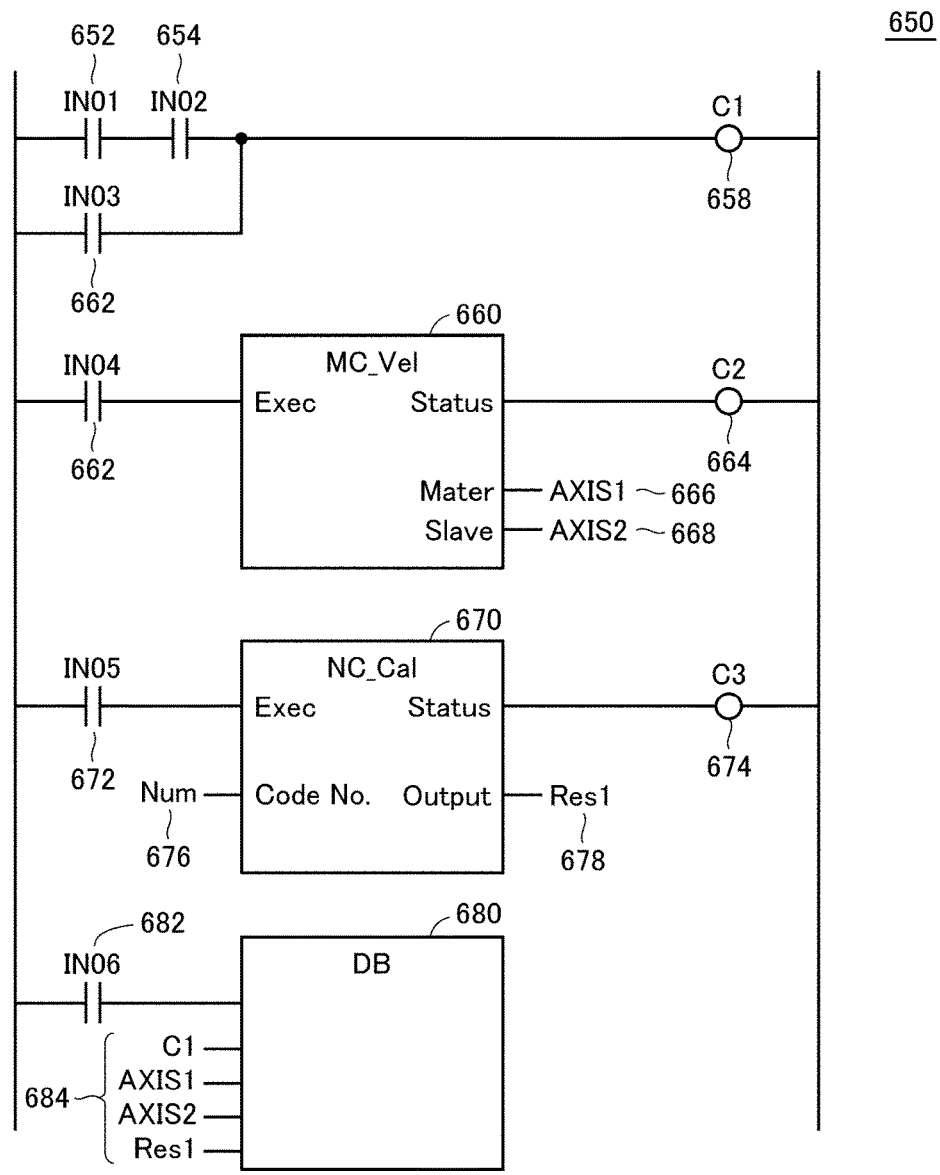
FIG. 14 is a diagram illustrating an example of an IEC program code for realizing the control structure illustrated in FIG. 13.

FIG. 14 is a diagram illustrating an example of an IEC program code for realizing the control structure illustrated in FIG. 13. Referring to FIG. 14, an IEC program code 650 includes a sequence instruction, a motion instruction, and an instruction of calculating a command value according to an NC program.

More specifically, the IEC program code 650 includes a sequence logic for switching a coil 658 (C1) to "ON" or "OFF." The coil 658 is driven by the logical OR of the logical AND of a contact 652 (IN01) and a contact 654 (IN02), and a contact 656 (IN03).

A function block 660 which defines the motion instruction is defined having a certain contact 662 (IN04) as an execution condition and executes a predefined motion instruction when a contact 662 is driven to "ON," and a command value calculated according to the execution is stored in two variables 666 and 668 (AXIS1 and AXIS2). A value indicating the execution state of the process in the function block 660 is stored in a coil 664 (C2) associated with the function block 660.

A function block 670 is defined having a certain contact 672 (IN05) as an execution condition, and the contact 672 is driven to "ON" to indicate execution of the NC program 32 in the NC program execution part 150. A command value calculated by the NC command value operation part 158 of the NC program execution part 150 in each control cycle is stored in a variable 678 (Res1) associated with an output node of the function block 670.

A value indicating the execution state of the process in the function block 670 is stored in a coil 674 (C3) associated with the function block 670. A variable 676 (Num) associated with the function block 670 specifies the NC program 32 to be executed. That is, the NC program 32 to be executed by the NC command value operation part 158 is specified according to a numerical value or a character stored in the variable 676. It is possible to realize processing and the like according to situation by updating or switching a numerical value or a character stored in the variable 676 according to an appropriate condition.

A function block 680 is defined having a certain contact 682 (IN06) as an execution condition, collects variable values defined as an input variable group 684 when the contact 682 is driven as "ON" and transmits the collected data to the server device 300 serving as a database, and the like.

The entire IEC program code 650 illustrated in FIG. 14 can be executed (scanned) in each control cycle to realize correction of a position command in each control cycle, as shown in FIG. 13. Meanwhile, it is possible to wait for calculation of a command value through the NC command value operation part 158 of the NC program execution part 150 and perform execution of the following instruction when the function block 670 of the IEC program code 650 is executed.

(h4: Processing Procedure)

Figure 15:
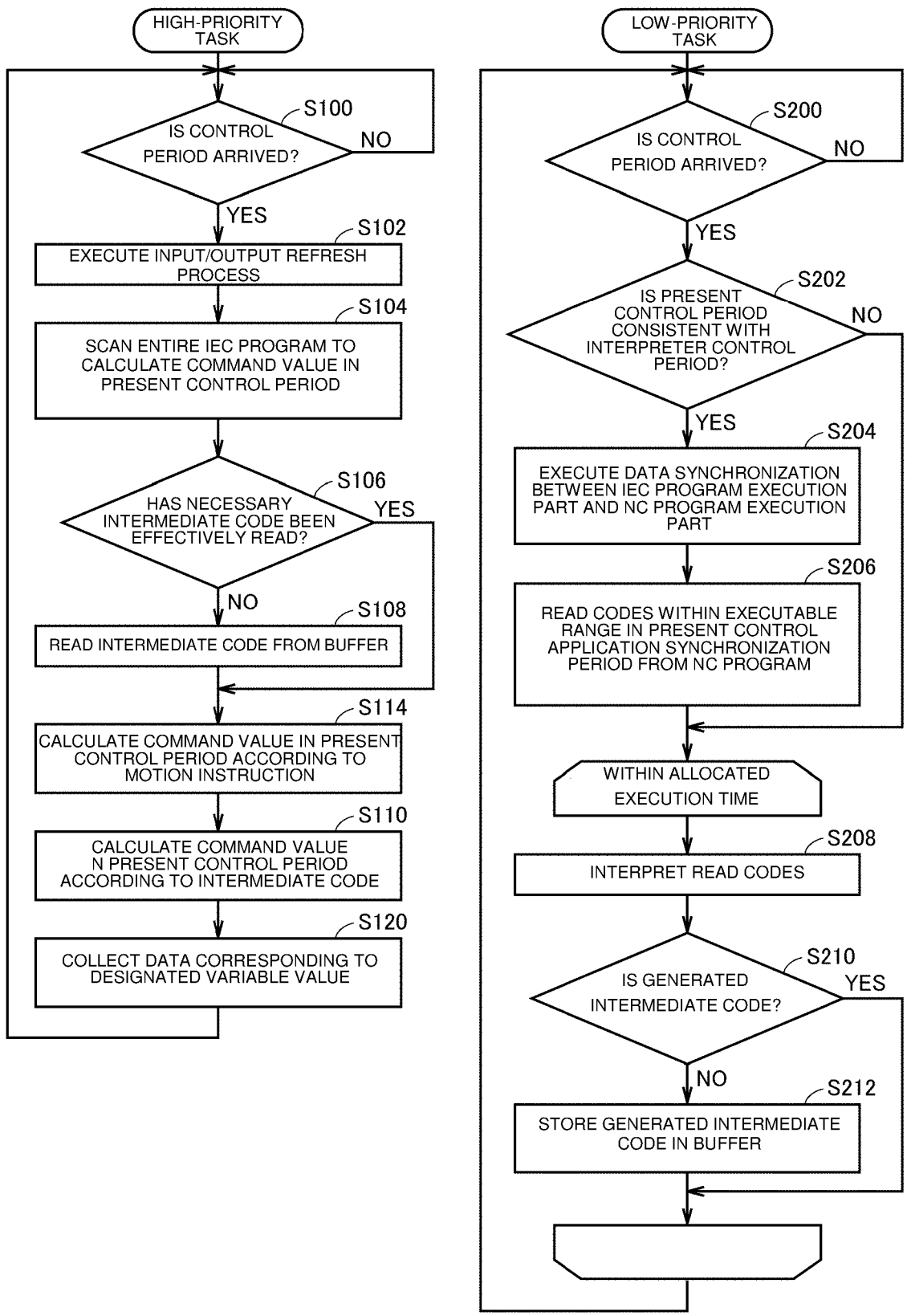
FIG. 15 is a flowchart illustrating a processing procedure executed in the control device of the control system illustrated in FIG. 12.

FIG. 15 is a flowchart illustrating a processing procedure executed in the control device 100 of the control system 1B shown in FIG. 12. FIG. 15 illustrates execution of a high-priority task and execution of a low-priority task. Substantially the same processes as those illustrated in FIG. 11 among processes shown in FIG. 15 are given the same step numbers as those in FIG. 11.

Referring to FIG. 15, when a control cycle is arrived with respect to the high-priority task (YES in step S100), the input/output interface processing part 162 executes the input/output refresh process (step S102). Accordingly, a command value calculated in the immediately previous control cycle is output to an actuator or the like and input data is acquired from a field.

The IEC program execution part 140 calculates one or more command values in the present control cycle by scanning the entire IEC program 30 (step S104). That is, command values according to a sequence instruction of the IEC program 30 are internally calculated.

The NC command value operation part 158 of the NC program execution part 150 determines whether an intermediate code necessary to calculate command values has been effectively read (step S106). When the intermediate code has not been effectively read (NO in step S106), the NC command value operation part 158 reads the intermediate code from the intermediate code buffer 154 (step S108). When the intermediate code has been effectively read (YES in step S106), the process of step S108 is skipped.

The motion command value operation part 142 of the IEC program execution part 140 calculates a command value in the present control cycle according to a motion instruction included in the IEC program 30 (step S114).

The NC command value operation part 158 of the NC program execution part 150 calculates a command value in the present control cycle according to the intermediate code (step S110).

Meanwhile, execution of the IEC program 30 in step S104 may be interrupted in the process of step S106 to S112.

Further, the IEC program execution part 140 collects data corresponding to a designated variable value (step S120). The data collected in step S120 may be transmitted in the same control cycle or may be queued and then transmitted to the outside through another task (task for which lower priority is set).

According to the above-described processes, a command value in the present control cycle is calculated. Then, the processes following step S100 are repeated. Meanwhile, a low-priority task is executed for a duration between completion of step S120 and arrival of the next control cycle.

On the other hand, processes with respect to the low-priority task are the same as the processes of corresponding steps shown in FIG. 11 and thus detailed description thereof will not be repeated.

(h5: Advantages)

According to the present embodiment, one or more pieces of input data updated in each control cycle and output data including command values calculated in each control cycle can be synchronized and collected in each control cycle. In addition, data collected in this manner can be transmitted to a higher-level server device and the like. Meanwhile, data transmission is executed through a task for which lower priority is set.

In this manner, according to the present embodiment, data related to a machine tool controlled according to the NC program 32 and data related to a field device directly controlled by the control device 100 can be collected in synchronization with each other.

In a system constructed by combining a machine tool which sequentially interprets an NC program to execute the NC program and a PLC which executes a sequence program in a fixed cycle, data collected in the respective devices should be separately acquired and data collecting timings does not correspond to each other, and thus excessive time and labor are required to generate and process data. In addition, data collecting intervals are different for devices in many cases and thus it is difficult to obtain completely synchronized data. Consequently, a utilization range of acquired data and effects of analysis thereof are limited and it is difficult to use the acquired data for predictive maintenance and the like.

On the other hand, in the control device 100 according to the present embodiment, command values and the like calculated according to the NC program 32 as well as data related to sequence processing and motion processing can be synchronized and collected in each control cycle. In addition, this collected data can be output a higher server device and other external devices.

It is possible to collect data of an entire production line including a machine tool using a single device by using the control device 100 according to the present embodiment in this manner. In addition, precise data analysis such as analysis of the tool life of a machine tool, predictive maintenance and quality of workpieces can be performed using the aforementioned synchronized data.

Furthermore, since the control device 100 has all of required data, the format of data transmitted to a higher server device can be easily set to a format specific to each production line, for example. As a result, data management at the side of the higher server device can be facilitated.

I. Modified Example

Although the control device 100 which executes the IEC program 30 and the NC program 32 has been described in the above description, any program described in the interpreter manner can be applied in the same manner.

K. Additional Remark 1

In an embodiment of the disclosure, a control device for controlling a control target is provided. The control device includes: a data update part which updates input data and output data in each control cycle; a first program execution part which scans an entire first program in each control cycle to update a command value; and a second program execution part which updates a command value in each control cycle according to a sequentially interpreted second program. The second program execution part includes: an interpreter which interprets at least part of the second program to generate an intermediate code; and a command value operation part which calculates the command value in each control cycle according to the intermediate code generated by the interpreter. The command value operation part outputs the command value in each control cycle in a manner in which the command value can be used in other processes.

According to this disclosure, a command value according to the first program and a command value according to the second program can be calculated in each control cycle, and these command values can be easily secondarily used. It is possible to realize higher control performance by using or processing a command value from each program calculated in each control cycle.

In the above-described disclosure, the control device may further include a shared memory through which the first program execution part refers to the command value calculated by the command value operation part in each control cycle.

According to this disclosure, a subject which executes each program and a subject which executes other processes can refer to necessary command values by accessing the shared memory, and thus implementation can be simplified.

In the above-described disclosure, the control device may further include an execution part which executes an operation process based on a command value calculated by the command value operation part in each control cycle and data updated by the data update part.

According to this disclosure, for example, a situation of a device can be acquired as input data and a command value can be corrected on the basis of the acquired input data. High-accuracy control depending on a situation can be realized according to such command value correction processing.

In the above-described disclosure, the operation process may include numerical value processing for a command value calculated by the command value operation part in each control cycle.

According to this disclosure, for example, a deviation amount and the like acquired through a certain method can be easily reflected in command values.

In the above-described disclosure, the control device may further include a generation part which generates at least one of data updated by the data update part and a command value updated by the first program execution part, and a command value calculated by the command value operation part in each control cycle as a data set.

According to this disclosure, at least one of data updated by the data update part and a command value updated by the first program execution part, and a command value calculated by the command value operation part, which are simultaneously acquired, can be associated with each other and acquired, and thus posteriori data analysis and the like can be efficiently performed.

In the above-described disclosure, the control device may further include an output part which externally outputs a data set generated in each control cycle.

According to this disclosure, an external device can efficiently analyze a data set synchronized and collected in the control device.

In the above-described disclosure, the intermediate code may include a function through which the command value operation part updates a command value in each control cycle.

According to this disclosure, the command value operation part can calculate a command value by performing an operation according to the function, and thus the process of calculating a command value in each control cycle can be simplified.

In the above-described disclosure, the intermediate code may include a function which defines a relationship between time and a command value.

According to this disclosure, when the command value operation part inputs a time indicating a command value calculating timing to the function, the command value operation part can calculate a command value at the timing, and thus the process related to calculation of a command value can be simplified.

In the above-described disclosure, the interpreter may sequentially queue generated intermediate codes in a buffer, and the command value operation part may be configured to read the intermediate codes in the order of being queued in the buffer.

According to this disclosure, it is possible to prevent a situation in which the second program execution part cannot calculate a command value from occurring by sequentially interpreting the second program in advance depending on a complexity, processing speed and the like of the second program.

In the above-described disclosure, the data update part, the first program execution part and the command value operation part may be executed as high-priority tasks, and the interpreter may be executed as a low-priority task.

According to this disclosure, since the interpreter is assigned lower priority than that set for subjects which execute other processes, it is possible to prevent the process of calculating a command value from being affected by the process of sequentially interpreting the second program.

In another example of the disclosure, a control method performed by a control device is provided. The control method includes: a step of updating input data and output data in each control cycle; a step of scanning an entire first program in each control cycle to update a command value; a step of interpreting at least part of a sequentially interpreted second program to generate an intermediate code; and a step of calculating a command value in each control cycle according to the generated intermediate code. The step of calculating a command value according to the intermediate code outputs a command value in each control cycle in a manner in which the command value can be used in other processes.

According to this disclosure, a command value according to the first program and a command value according to the second program can be calculated in each control cycle, and these command values can be easily secondarily used. It is possible to realize higher control performance by using or processing a command value from each program calculated in each control cycle.

According to an example of the disclosure, an environment for realizing higher control performance can be realized in a control device capable of executing a first program entirely scanned in each control cycle to update command values and a sequentially analyzed second program.

K. Additional Remark 2

[Configuration 1]

The present embodiment as described above includes the following technical ideas.

A control device (100) for controlling a control target, including:

a data update part (50, 162) which updates input data and output data in each control cycle;

a first program execution part (54, 140) which scans an entire first program (62, 30) in each control cycle to update a command value (72); and a second program execution part (56, 150) which updates a command value (74) in each control cycle according to a sequentially interpreted second program (64, 32), wherein the second program execution part includes:

an interpreter (58, 152) which interprets at least part of the second program to generate an intermediate code; and a command value operation part (60, 158) which calculates the command value (74) in each control cycle according to the intermediate code generated by the interpreter, wherein the command value operation part (60, 158) outputs the command value in each control cycle in a manner in which the command value can be used in other processes.

[Configuration 2]

The control device disclosed in configuration 1, further including a shared memory (52; 160) through which the first program execution part refers to the command value calculated by the command value operation part in each control cycle.

[Configuration 3]

The control device disclosed in configuration 1 or 2, further including an execution part (140; 150; 600) which executes an operation process based on a command value calculated by the command value operation part in each control cycle and data updated by the data update part.

[Configuration 4]

The control device disclosed in configuration 3, wherein the operation process includes numerical value processing for a command value calculated by the command value operation part in each control cycle.

[Configuration 5]

The control device disclosed in any one of configurations 1 to 4, further including a generation part (140; 150; 650) which generates at least one of data updated by the data update part and a command value updated by the first program execution part, and a command value calculated by the command value operation part in each control cycle as a data set.

[Configuration 6]

The control device disclosed in configuration 5, further including an output part (164) which externally outputs a data set generated in each control cycle.

[Configuration 7]

The control device disclosed in any one of configurations 1 to 6, wherein the intermediate code includes a function through which the command value operation part updates a command value in each control cycle.

[Configuration 8]

The control device disclosed in configuration 7, wherein the intermediate code includes a function which defines a relationship between time and a command value.

[Configuration 9]

The control device disclosed in any one of configurations 1 to 8, wherein the interpreter sequentially queues generated intermediate codes in a buffer, and the command value operation part is configured to read the intermediate codes in the order of being queued in the buffer.

[Configuration 10]

The control device disclosed in any one of configurations 1 to 9, wherein the data update part, the first program execution part and the command value operation part are executed as high-priority tasks, and the interpreter is executed as a low-priority task.

[Configuration 11]

A control method performed by a control device including:

a step (S102) of updating input data and output data in each control cycle;

a step (S104) of scanning an entire first program in each control cycle to update a command value;

a step (S208 and S210) of interpreting at least part of a sequentially interpreted second program to generate an intermediate code; and a step (S110) of calculating a command value in each control cycle according to the generated intermediate code, wherein the step of calculating a command value according to the intermediate code outputs a command value in each control cycle in a manner in which the command value can be used in other processes.

The disclosed embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A control device, controlling a control target, comprising:
    a data update part, updating input data and output data in each control cycle;
    a first program execution part, scanning an entire first program in each control cycle to update a first command value;
    a second program execution part, updating a second command value in each control cycle according to a sequentially interpreted second program; and
    a shared memory, storing the command values respectively updated by the first and the second program execution parts,
    wherein the second program execution part comprises:
    an interpreter, interpreting at least part of the second program to generate an intermediate code; and
    a command value operation part, calculating the second command value in each control cycle according to the intermediate code generated by the interpreter,
    wherein the command value operation part outputs the second command value in each control cycle in a manner which the second command value can be used in other processes, and through the shared memory, the first program execution part refers to the second command value calculated by the second command value operation part in each control cycle.

2. The control device according to claim 1, further comprising an execution part which executes an operation process based on the second command value calculated by the command value operation part in each control cycle and data updated by the data update part.

3. The control device according to claim 2, wherein the operation process includes numerical value processing for the second command value calculated by the command value operation part in each control cycle.

4. The control device according to claim 1, further comprising a generation part which generates at least one of data updated by the data update part and the second command value updated by the first program execution part, and the second command value calculated by the command value operation part in each control cycle as a data set.

5. The control device according to claim 4, further comprising an output part which externally outputs a data set generated in each control cycle.

6. The control device according to claim 1, wherein the intermediate code includes a function through which the command value operation part updates the second command value in each control cycle.

7. The control device according to claim 6, wherein the intermediate code includes a function which defines a relationship between time and the second command value.

8. The control device according to claim 1, wherein the interpreter sequentially queues generated intermediate codes in a buffer, and
    the command value operation part is configured to read the intermediate codes in the order of being queued in the buffer.

9. The control device according to claim 1, wherein the data update part, the first program execution part and the command value operation part are executed as high-priority tasks, and
    the interpreter is executed as a low-priority task.

10. A control method performed by a control device, comprising:
    a step of updating input data and output data in each control cycle;
    a step of scanning an entire first program in each control cycle to update a first command value;
    a step of interpreting at least part of a sequentially interpreted second program to generate an intermediate code; and
    a step of calculating a second command value in each control cycle according to the generated intermediate code,
    wherein the step of calculating the second command value according to the intermediate code outputs the second command value in each control cycle in a manner in which the second command value can be used in other processes, and through a shared memory, the step of scanning the entire first program refers to the second command value calculated in the step of calculating the second command value in each control cycle.

* * * * *